(12) United States Patent
Okuda et al.

(10) Patent No.: US 12,530,294 B2
(45) Date of Patent: Jan. 20, 2026

(54) CACHE SERVER AND CONTENT DELIVERY SYSTEM

(71) Applicant: Kioxia Corporation, Tokyo (JP)

(72) Inventors: Kohei Okuda, Koganei (JP); Shinichi Kanno, Ota (JP); Tatsuki Izumi, Yokohama (JP); Toru Watabe, Yokohama (JP); Hideki Yoshida, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/829,375

(22) Filed: Sep. 10, 2024

(65) Prior Publication Data
US 2025/0278363 A1 Sep. 4, 2025

(30) Foreign Application Priority Data
Mar. 4, 2024 (JP) ................. 2024-032234

(51) Int. Cl.
*G06F 12/00* (2006.01)
*G06F 12/0802* (2016.01)

(52) U.S. Cl.
CPC ...... *G06F 12/0802* (2013.01); *G06F 2212/60* (2013.01)

(58) Field of Classification Search
CPC ................. G06F 12/0802; G06F 2212/60
See application file for complete search history.

(56) References Cited

U.S. PATENT DOCUMENTS

| | | | |
|---|---|---|---|
| 9,558,065 B2 | 1/2017 | Yoshida et al. | |
| 2012/0005433 A1* | 1/2012 | Thilagar | H04L 67/568 |
| | | | 711/E12.017 |
| 2012/0317235 A1* | 12/2012 | Nguyen | H04L 47/15 |
| | | | 709/219 |
| 2018/0011662 A1* | 1/2018 | Ishii | G06F 3/0619 |
| 2019/0026196 A1* | 1/2019 | Resch | G06F 11/3466 |
| 2020/0244758 A1* | 7/2020 | Enguehard | H04L 67/5682 |

FOREIGN PATENT DOCUMENTS

| | | | | |
|---|---|---|---|---|
| CN | 117857464 A | * | 4/2024 | ........ H04L 43/0876 |
| KR | 20130089929 A | * | 8/2013 | ........ G06F 12/0802 |
| WO | WO-2023013649 A1 | * | 2/2023 | ........... G06F 12/126 |

* cited by examiner

*Primary Examiner* — Shawn X Gu
*Assistant Examiner* — Mohammad S Hasan
(74) *Attorney, Agent, or Firm* — Oblon, McClelland, Maier & Neustadt, L.L.P.

(57) ABSTRACT

According to one embodiment, a processor of a cache server delivers content acquired from an origin server to a client, using a storage device as a cache of the contents. When an error occurs in reading the content from the storage device, the processor determines whether or not to recover the content based on a recovery amount of a delivery capability of the cache server as a result of recovering the content and a cost of writing data to the storage device associated with recovery of the content. When determined to recover the content, the processor selects a content recovery method based on a first remaining retention period during which the content should be retained and a second remaining retention period until the content is to be erased from the storage device.

20 Claims, 18 Drawing Sheets

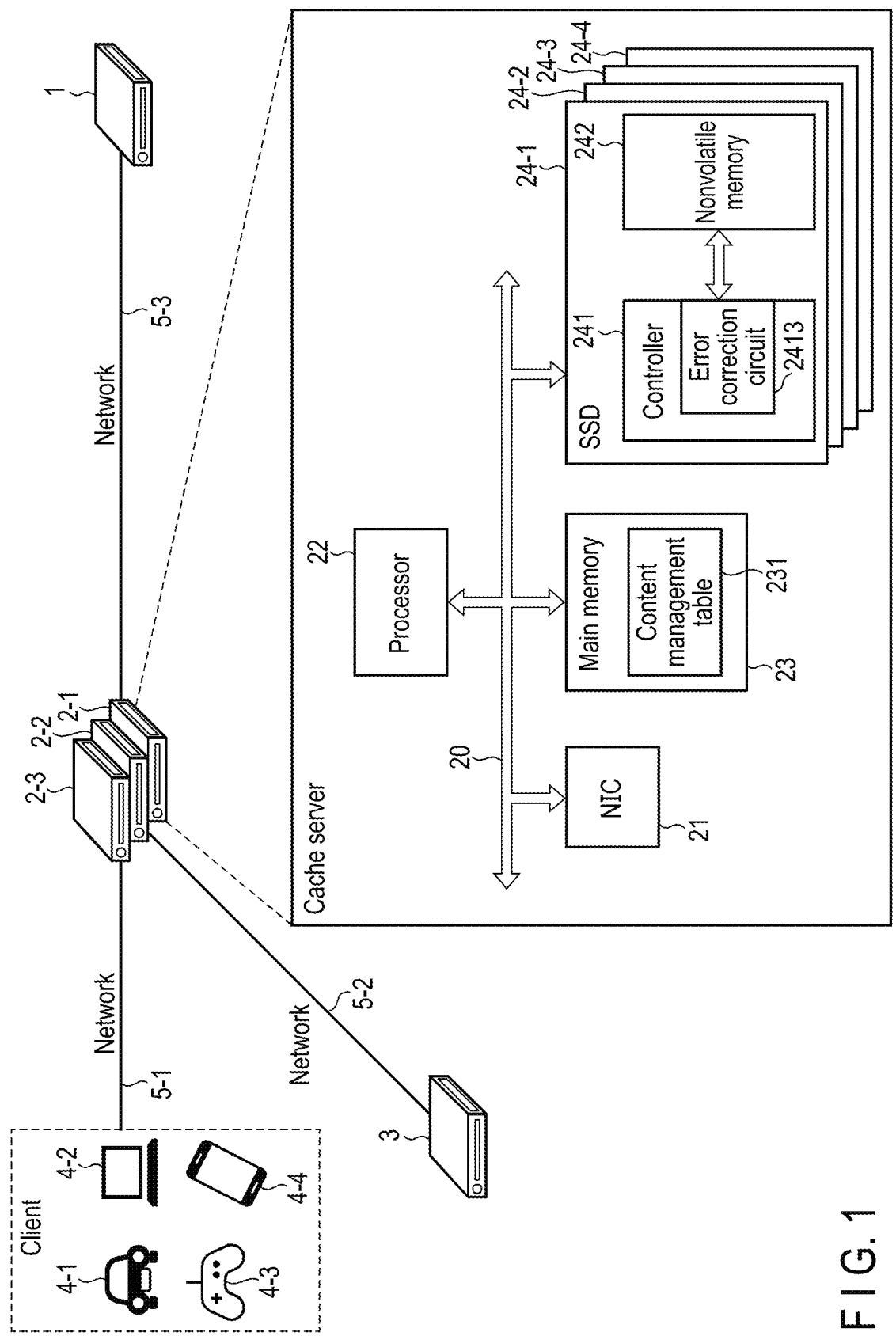
F I G. 1

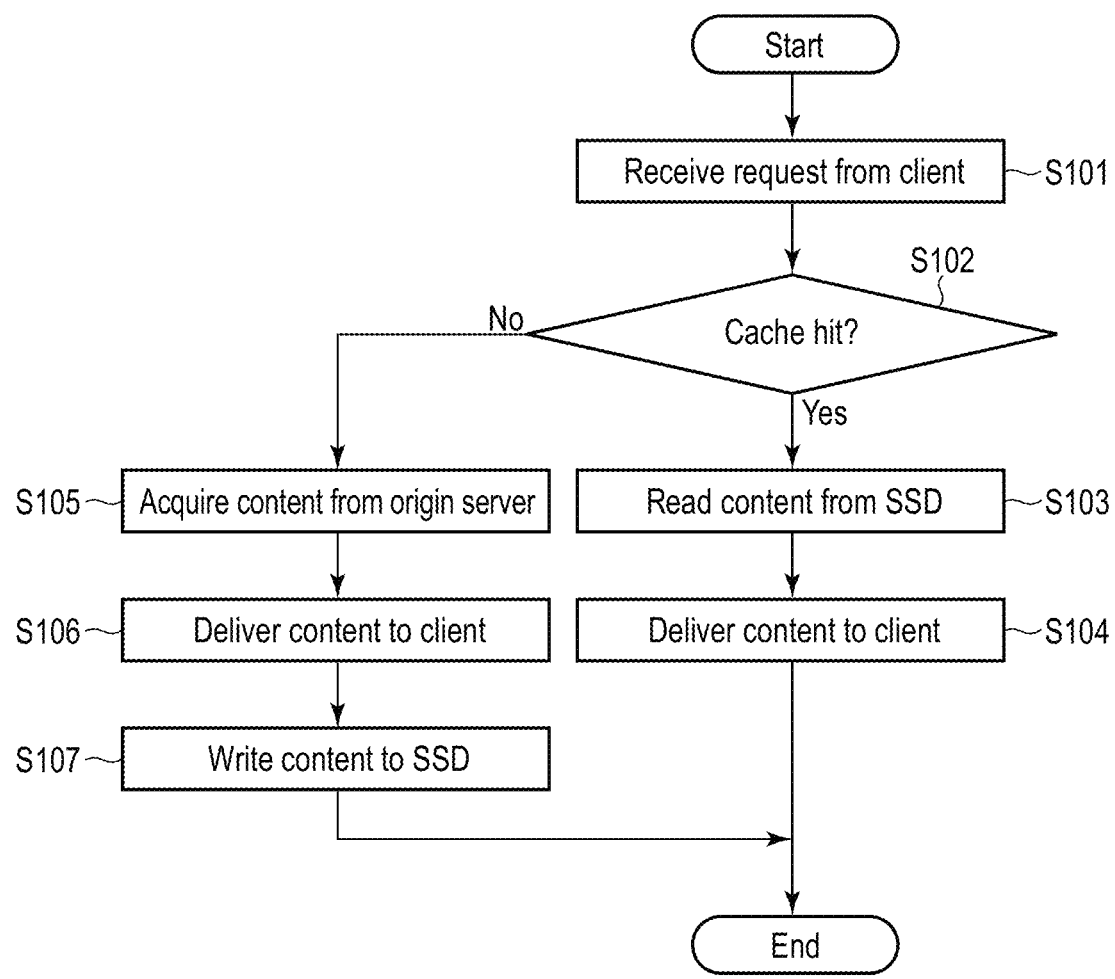
F I G. 6

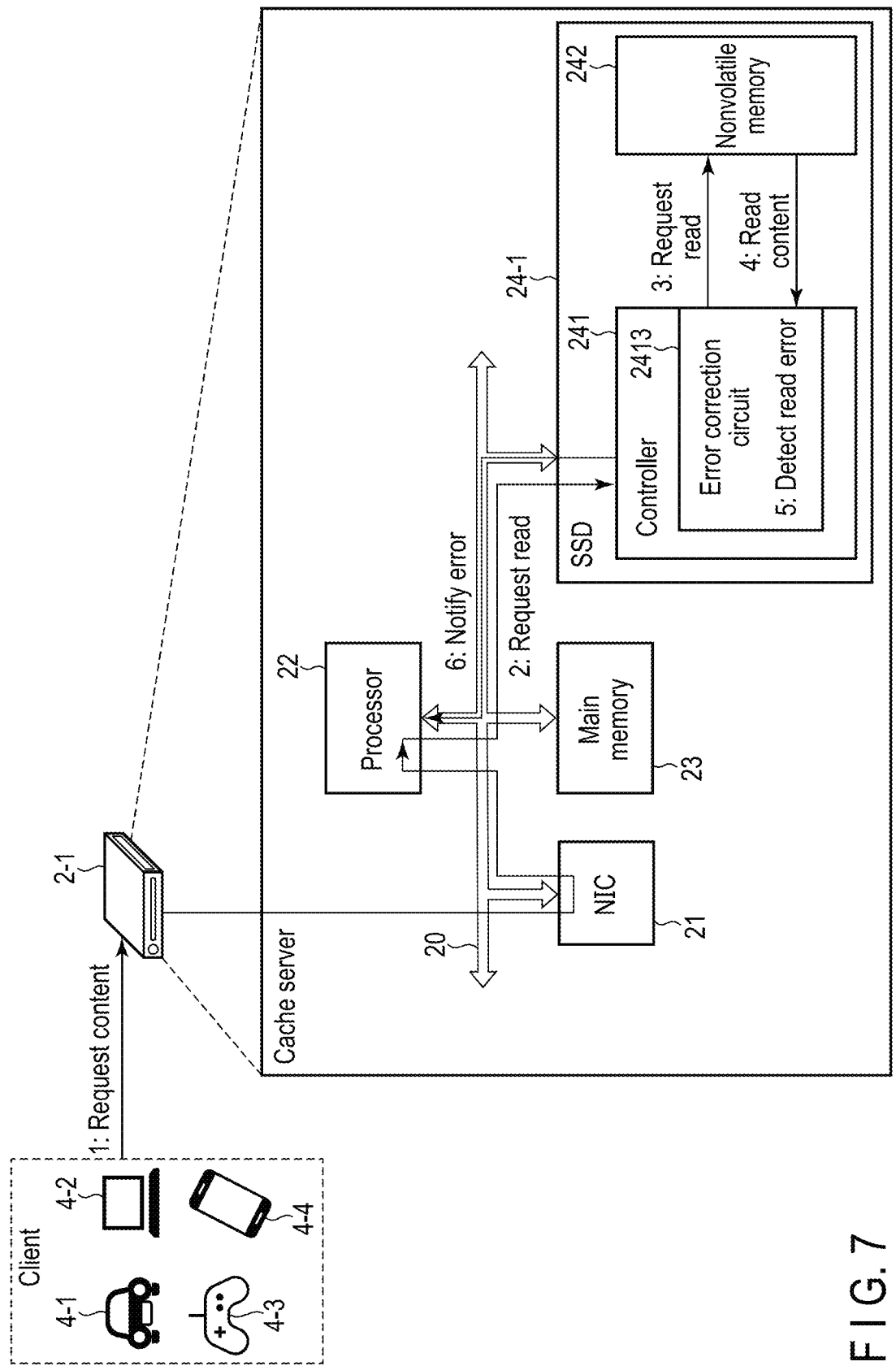
F I G. 7

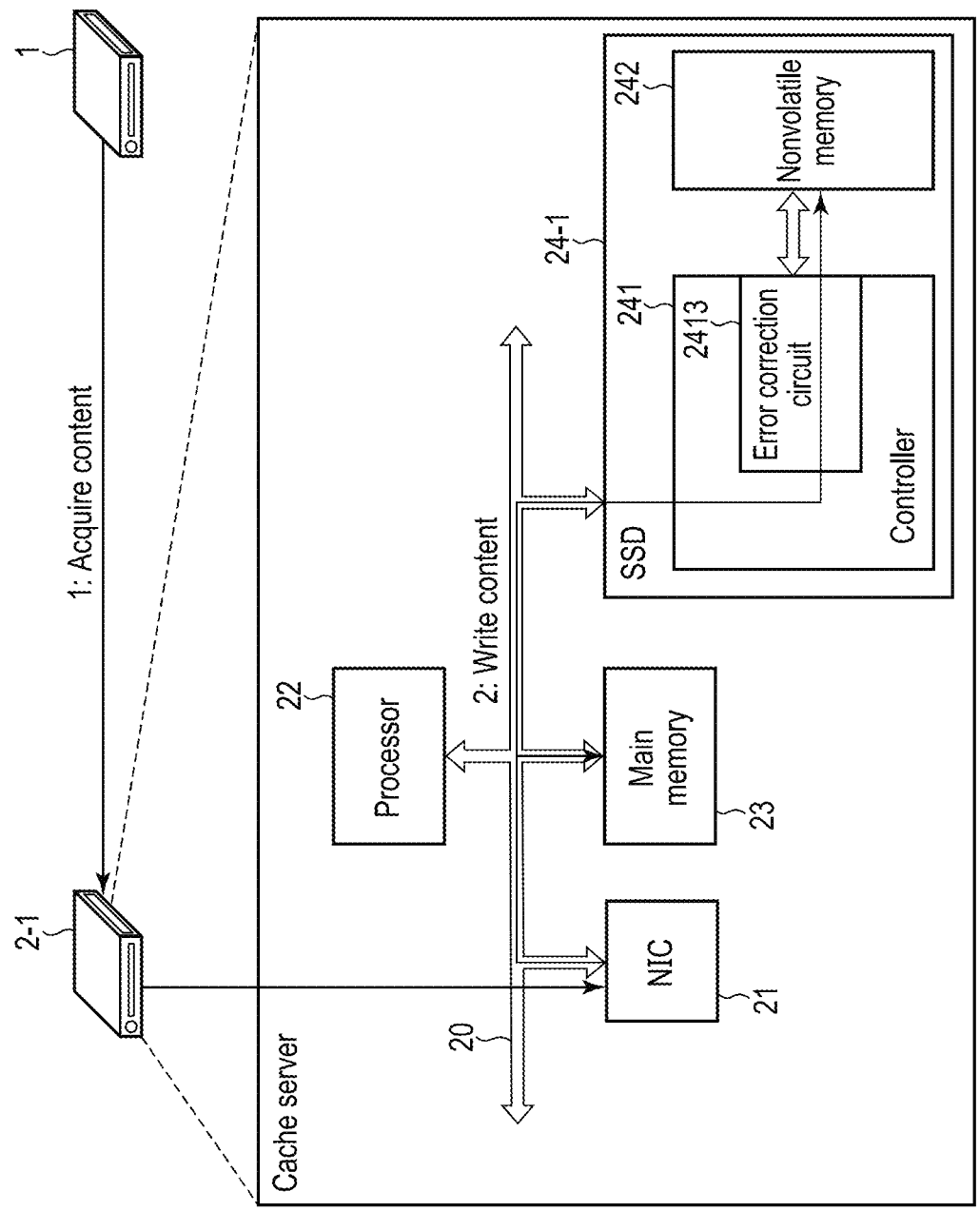
F I G. 8

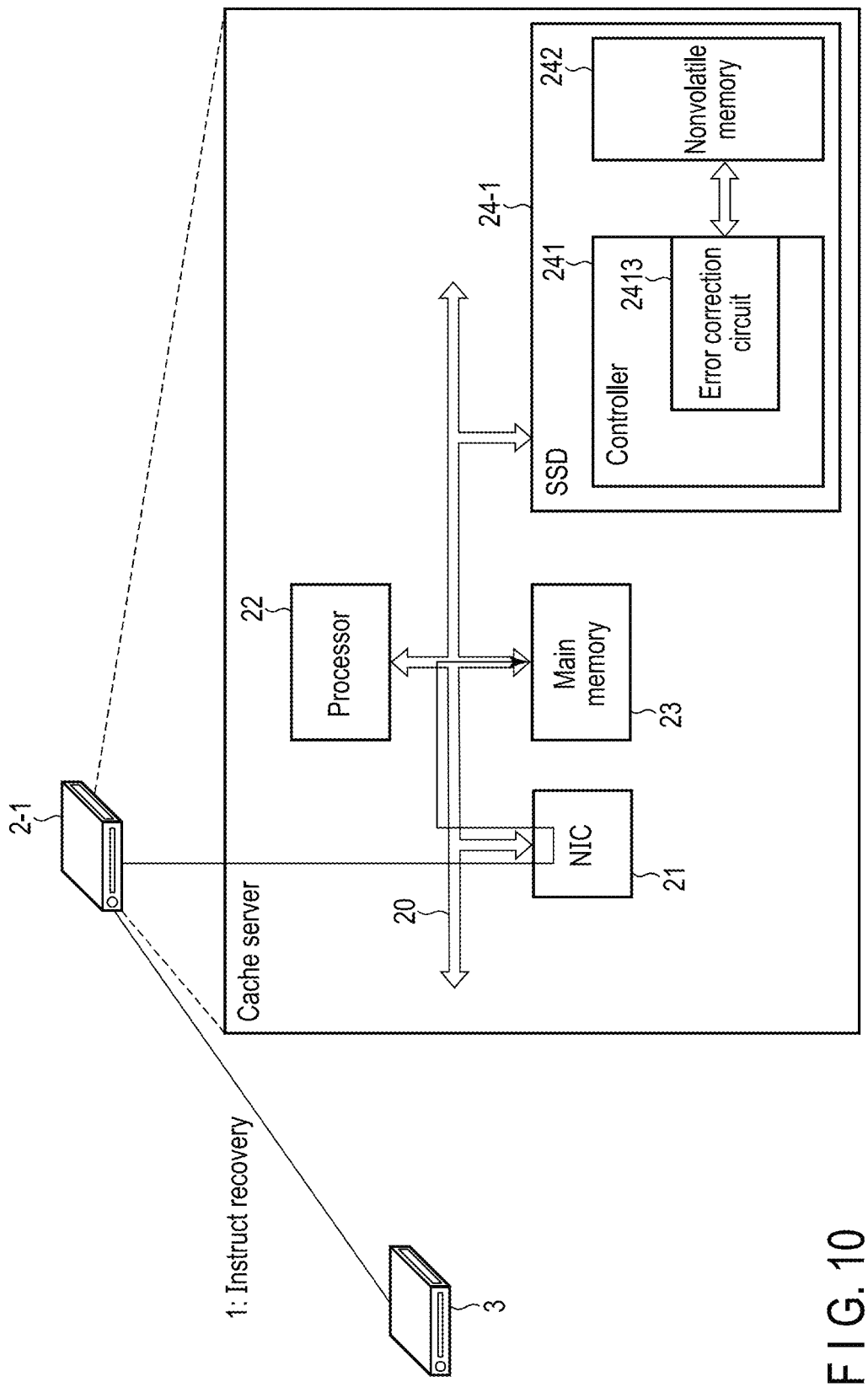
F I G. 10

| Content | Predicted number of reads/second | ... |
|---|---|---|
| Content C1 | 30 | ... |
| Content C2 | 50 | ... |
| Content C3 | 20 | ... |
| Content C4 | 30 | ... |
| Content C5 | 45 | ... |
| Content C6 | 25 | ... |
| Delivery capability | A1 | |

F I G. 11

| Content | Predicted number of reads/second | ... |
|---|---|---|
| Content C1 | 30 | ... |
| Content C2 | 50 | ... |
| Content C3 | 20 | ... |
| Content C4 | 30 | ... |
| Content C5 | 45 | ... |
| Content C6 | 25 | ... |
| Delivery capability | A1→A2 (A1>A2) | |

Read error → Content C4

F I G. 12

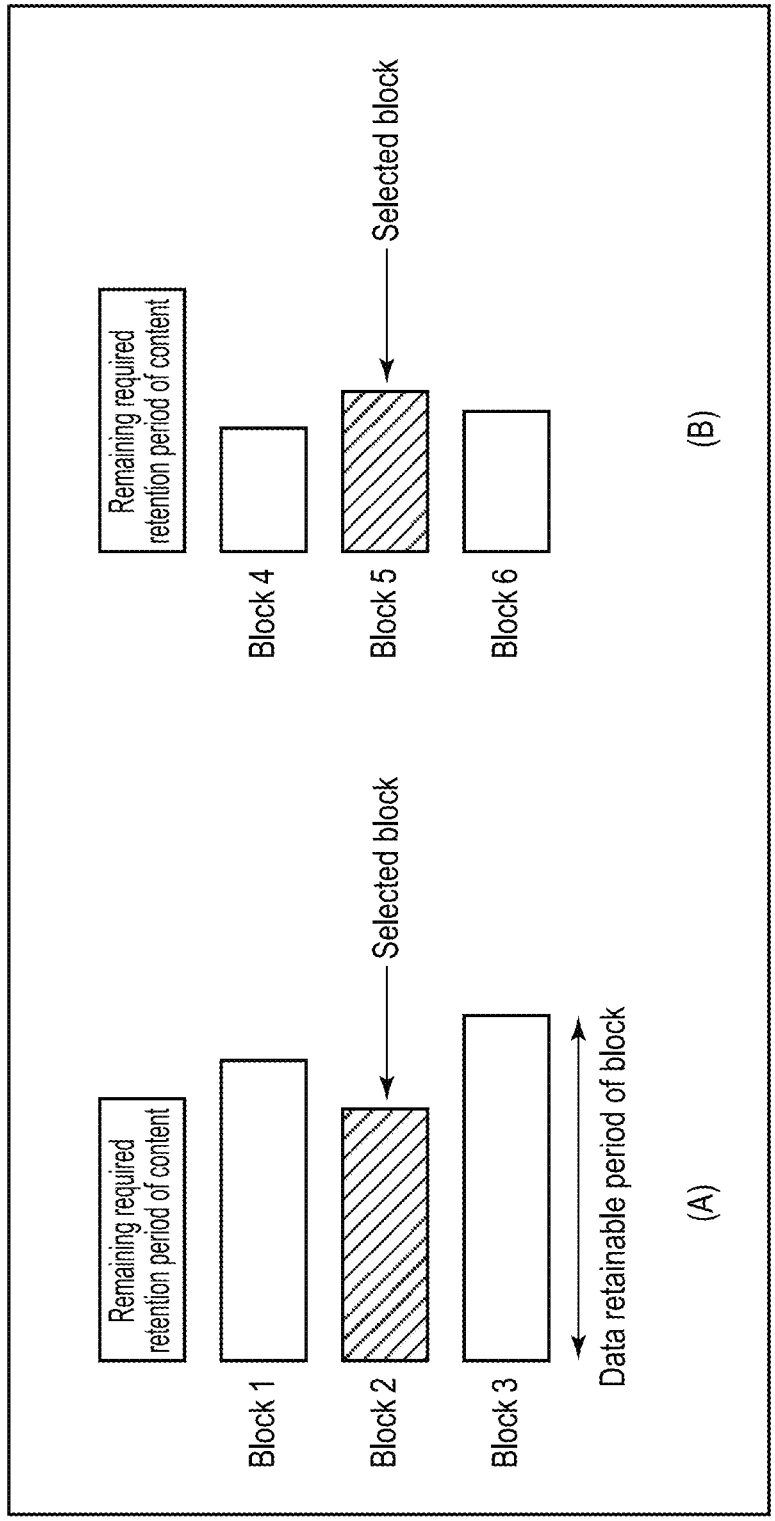
F I G. 14

Recovery data management table

| Content ID | Error occurrence address | Error occurrence range | Recovery data storage address | Evaluation value |
|---|---|---|---|---|
| XXX | | | | |

Recovery block management table

| Recovery block ID | Address | Total evaluation value |
|---|---|---|
| YYY | | |

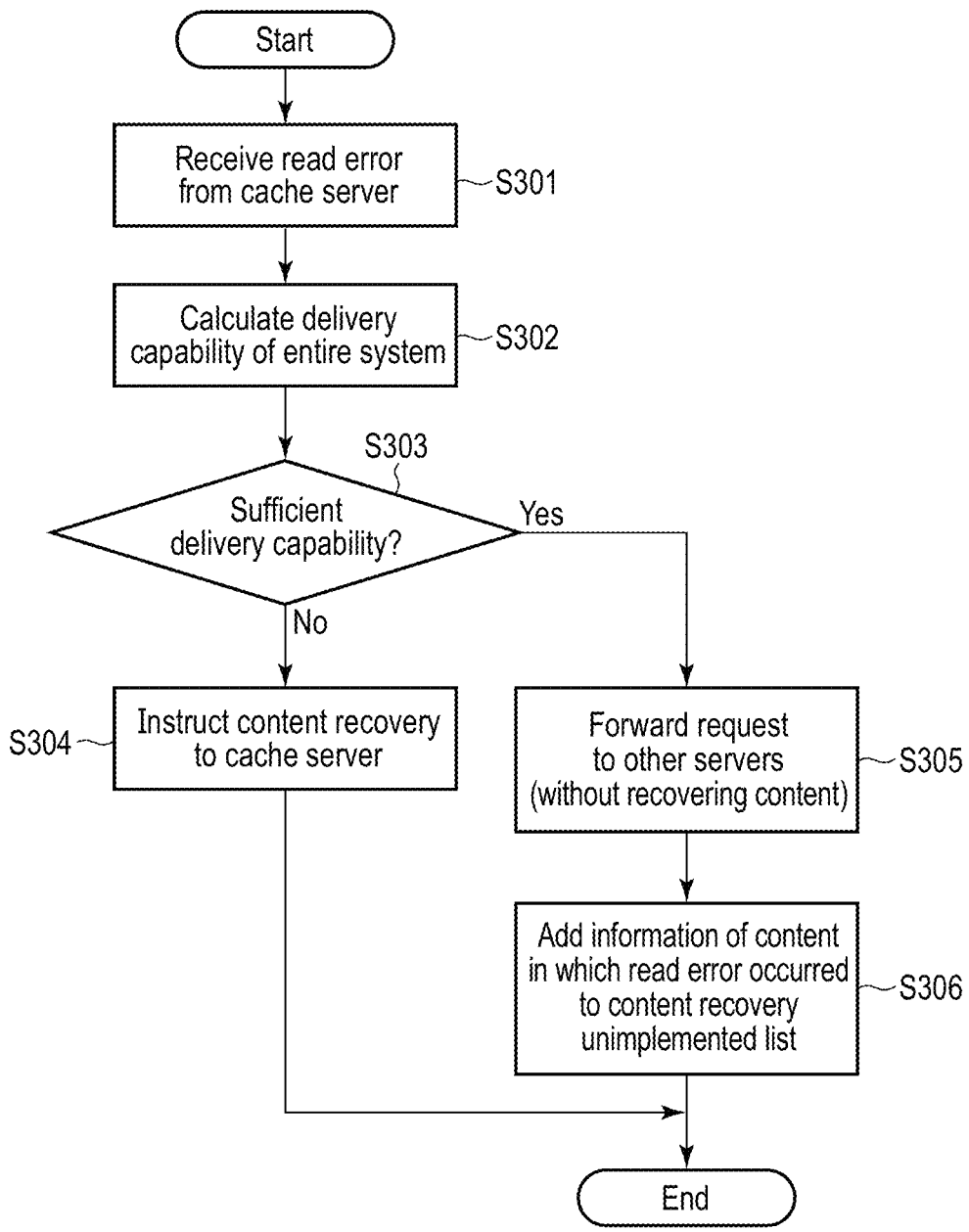
F I G. 19

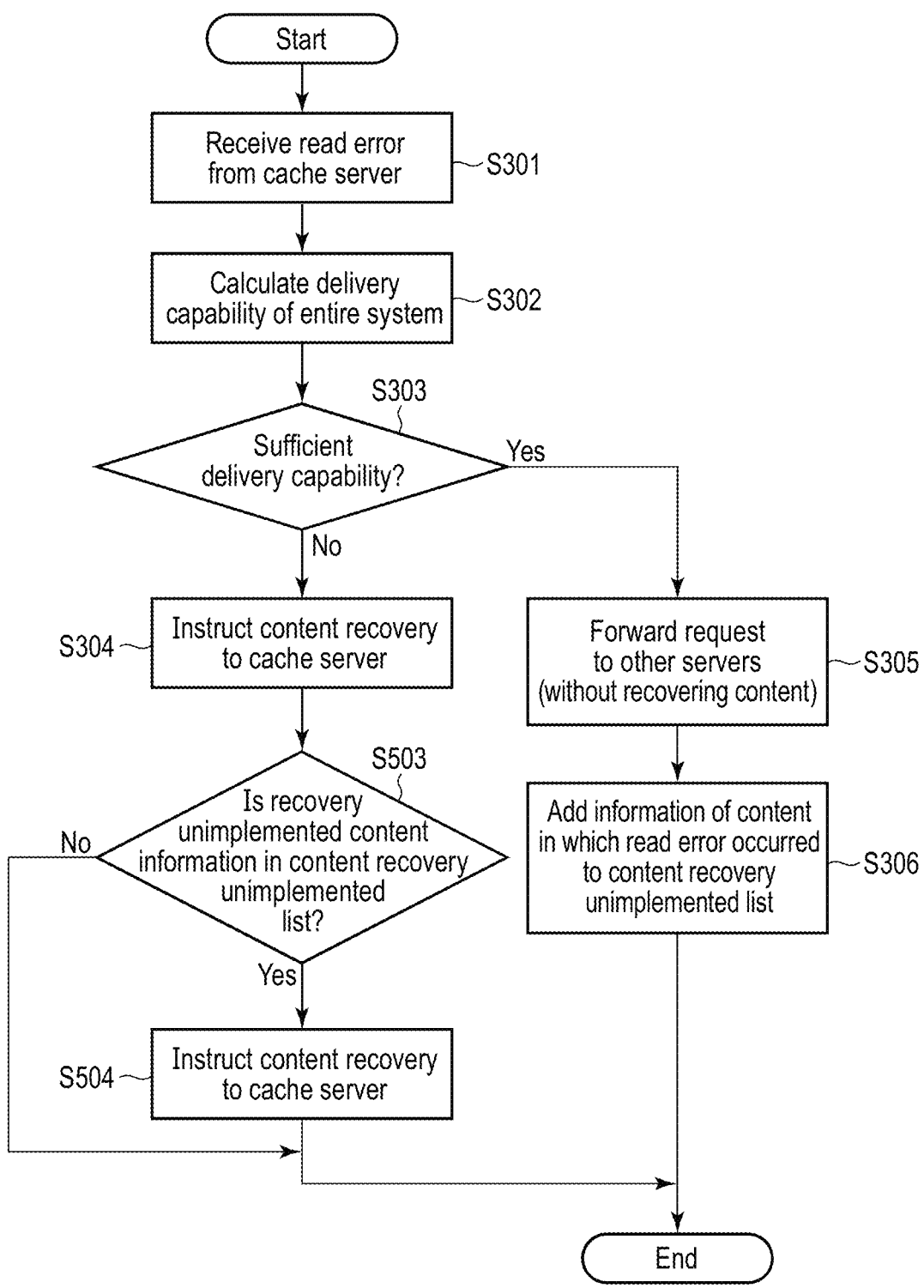
F I G. 22

CACHE SERVER AND CONTENT DELIVERY SYSTEM

CROSS-REFERENCE TO RELATED APPLICATIONS

This application is based upon and claims the benefit of priority from Japanese Patent Application No. 2024-032234, filed Mar. 4, 2024, the entire contents of which are incorporated herein by reference.

FIELD

Embodiments described herein relate generally to a cache server and a content delivery system.

BACKGROUND

A content delivery network (CDN) is known as an information delivery system that has become widely used in recent years.

In the information delivery system such as the CDN, multiple cache servers connected to an original server are used to prevent concentration of access to the origin server and thereby to improve speed of content delivery.

Each of the multiple cache servers acquires content requested by a certain client from the origin server, delivers the acquired content to the client, and stores it in a storage device provided in the cache server, respectively. Subsequently, when another client requests to deliver this content, the cache server reads this content from the storage device and delivers the read content to the another client.

Recently, a solid state drive (SSD), which include a nonvolatile memory such as a NAND flash memory and a controller that controls the nonvolatile memory, has begun to be used as the storage device for the cache server.

There may be a case where a cache server is unable to successfully read content, from a nonvolatile memory in SSD, that has been requested by a client and that has been previously stored in the nonvolatile memory of the SSD. At this time, the cache server may determine that this content does not originally exist in the SSD, instead of determining as an occurrence of a read error. In this case, the cache server acquires such content from the origin server, delivers the acquired content to the client, and writes the acquired content to the nonvolatile memory of the SSD in order to recover the content which was unable to successfully be read.

However, since the nonvolatile memory wears out as a program/erase cycle progresses due to characteristics thereof, there is an upper limit to the number of program/erase cycles (number of rewrites) of the nonvolatile memory, and it is required to control writing to the nonvolatile memory so as not to exceed the upper limit of the number of program/erase cycles.

Therefore, in a cache server using a nonvolatile memory as a cache, a technology capable of suppressing the wear of the nonvolatile memory is required.

BRIEF DESCRIPTION OF THE DRAWINGS

FIG. 1 is a diagram showing an example of a configuration of an information delivery system including a cache server according to an embodiment.

FIG. 6 is a flowchart showing a procedure of content delivery processing executed in the cache server according to the embodiment.

FIG. 7 is a diagram illustrating error detection processing executed in the information delivery system including the cache server according to the embodiment.

FIG. 8 is a diagram illustrating content recovery processing executed in the information delivery system including the cache server according to the embodiment.

FIG. 10 is a diagram illustrating recovery instruction transmission processing executed in the information delivery system including the cache server according to the embodiment.

FIG. 11 is a diagram showing a first example of a delivery capability of the cache server according to the embodiment.

FIG. 12 is a diagram showing a second example of the delivery capability of the cache server according to the embodiment.

FIG. 14 is a diagram illustrating a method of selecting a block to write a recovery target portion of the content in the cache server according to the embodiment.

FIG. 19 is a flowchart showing an example of an operation procedure in a case where a control server of the information delivery system including the cache server according to the embodiment receives a notification that a content read error has occurred.

FIG. 22 is a flowchart showing an example of an operation procedure in which a cache server is instructed to recover content based on the content recovery unimplemented list in a case where the control server of the information delivery system including the cache server according to the embodiment receives notification that a content read error has occurred.

DETAILED DESCRIPTION

Figure 2:
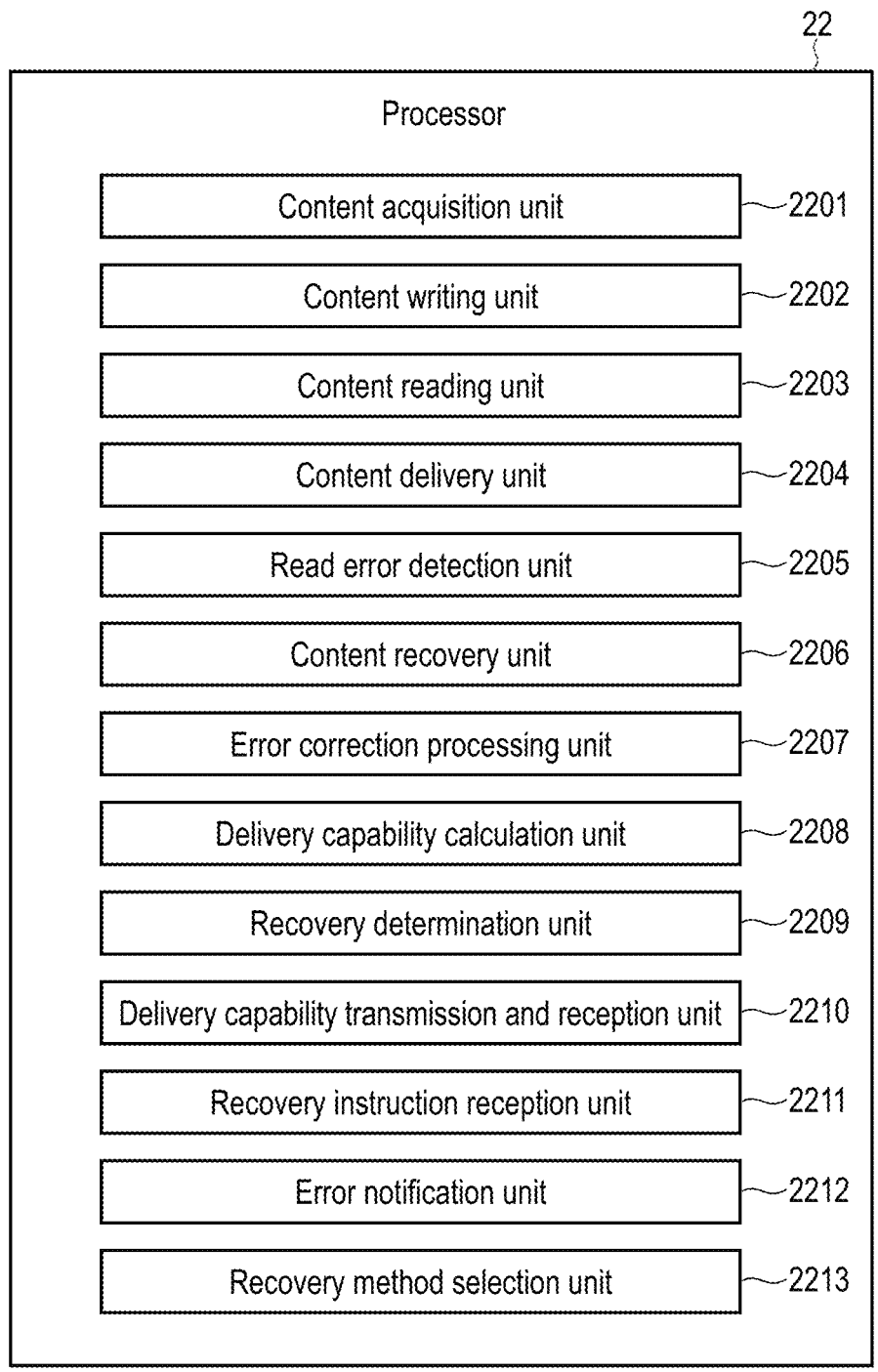
FIG. 2 is a block diagram showing an example of a functional configuration of a processor of the cache server according to the embodiment.

In general, according to one embodiment, a cache server connectable via a network to an origin server holding content includes a storage device and a processor. The storage device includes a controller and a nonvolatile memory of which data retainable period and number of writes is finite. The controller controls the nonvolatile memory. The processor is capable of delivering the content acquired from the origin server to a client requesting the content. The storage device is capable of caching the content held on the origin server. When an error occurs when reading the cached content from the storage device, the processor determines whether or not to recover the content based on a recovery amount of a delivery capability of the cache server as a result of recovering the content and a cost of writing data to the storage device associated with recovery of the content. When determined to recover the content, the processor selects a recovery method of the content based on a first remaining retention period during which the content should be retained and a second remaining retention period until the content is to be erased from the storage device.

Embodiments will be described with reference to the drawings below.

FIG. 1 is a diagram showing an example of a configuration of an information delivery system including a cache server according to an embodiment. The information delivery system is a system for delivering contents to various client terminals (clients 4-1 to 4-4 in FIG. 1) via a network 5 such as the Internet, and is implemented as a CDN, for example. The information delivery system includes an origin server 1, one or more cache servers 2 (three cache servers 2-1 to 2-3 in FIG. 1), and a control server 3. The network 5 includes, for example, a network 5-1, a network 5-2, and a network 5-3. The origin server 1, the cache servers 2-1 to 2-3, the control server 3, and the clients 4-1 to 4-4 are connected via the network 5.

The origin server 1 is a server that retains a plurality of contents. The origin server 1 is also referred to as a delivery server. The content is, for example, a moving image, an image, or any other type of data.

Each of the cache servers 2-1 to 2-3 is a server that temporarily caches contents. Each of the cache servers 2-1 to 2-3 caches the content delivered by the origin server 1. Then, in response to reception of a request from the clients 4-1 to 4-4, the cache servers 2-1 to 2-3 deliver the cached contents to the clients 4-1 to 4-4 instead of the origin server 1. Specifically, each of the cache servers 2-1 to 2-3 determines whether or not a first content requested from the clients 4-1 to 4-4 is cached, reads the first content in a case where the first content is cached, and delivers the read first content to the clients 4-1 to 4-4. In a case where the cache servers 2-1 to 2-3 is not cached, the cache servers 2-1 to 2-3 acquire the first content from the origin server 1, deliver the acquired first content to the client, and cache the acquired first content.

The control server 3 is a server that controls the cache servers provided in the information delivery system. In the present embodiment, since the information delivery system includes the cache servers 2-1 to 2-3, the control server 3 controls these cache servers 2-1 to 2-3. The control server 3 may also function as, for example, a DNS server. The control server 3 functioning as a DNS server converts a URL received from any one of the clients 4-1 to 4-4 into an address (IP address) corresponding to the cache server to be accessed among the cache servers 2-1 to 2-3, and returns the address (IP address) to the client. Any server outside of the control server 3 may also function as the DNS server. Furthermore, the control server 3 may function as a load balancer for selecting a cache server that performs a content delivery service from the cache servers 2-1 to 2-3.

The clients 4-1 to 4-4 are client terminals that use contents. The client is, for example, a car (or an in-vehicle device), a computer, a game machine, or a smartphone (or a portable phone). Each of the clients 4-1 to 4-4 transmits a request designating a certain content to any one of the cache servers 2-1 to 2-3 via the network 5-1. Specifically, each of the clients 4-1 to 4-4 transmits a request to a cache server designated by an address acquired from the DNS server.

Next, an example of a configuration of the cache server will be described. Here, an example of a configuration of the cache server 2-1 will be described, but the other cache servers 2-2 and 2-3 also have the similar configuration to the cache server 2-1.

The cache server 2-1 includes a network interface controller (NIC) 21, a processor 22, a main memory 23, and a plurality of solid state drives (SSD) 24-1 to 24-4. The NIC 21, the processor 22, the main memory 23, and the SSDs 24-1 to 24-4 are connected to each other via a bus 20.

The NIC 21 is an interface circuit. The NIC 21 communicates with each of an external client (clients 4-1 to 4-4) and an external server (for example, the control server 3, the origin server 1, and other cache servers 2-2 to 2-3) via the network 5.

The processor 22 is a central processing unit (CPU). The processor 22 controls the operation of the entirety of the cache server 2-1 by controlling each component of the cache server 2-1. The processor 22 executes software (host software) loaded into the main memory 23 from the SSDs 24-1 to 24-4 or another storage device connected to the cache server 2-1. The host software includes, for example, an operating system, a file system, and application programs.

The main memory 23 is a volatile memory. The main memory 23 is, for example, a dynamic random access memory (DRAM). A part of a storage area of the main memory 23 is used as a data buffer. The data buffer temporarily stores contents to be written to or read from the SSDs 24-1 to 24-4. In addition, another storage area of the main memory 23 is used, for example, to store a content management table 231. The content management table 231 is a table for managing each of the contents cached in the cache server 2-1. The content management table 231 retains management information corresponding to each of the content stored in each of the plurality of SSDs 24-1 to 24-4 in the cache server 2-1. Management information corresponding to a certain content includes, for example, information for identifying this content, a size of this content, address information indicating a storage area in which this content is stored, a predicted number of reads of this content, a data retention request period of this content, and a remaining data retention request period of this content.

The SSDs 24-1 to 24-4 are storage devices. The nonvolatile memory of each of the SSDs 24-1 to 24-4 is used as a cache for storing one or more contents. Note that although FIG. 2 shows an example in a case where each cache server 2 includes a plurality of SSDs as storage devices, each cache server 2 may include only one SSD 24 as a storage device.

Next, an example of a configuration of the storage device will be described. Here, an example of a configuration of the SSD 24-1 will be described, but the other SSDs 24-2 to 24-4 also have the similar configuration to the SSD 24-1.

The SSD 24-1 includes a controller 241 and the nonvolatile memory 242. The controller 241 is a control circuit that controls the nonvolatile memory 242. The controller 241 writes data to or reads data from the nonvolatile memory 242 based on a command received from the processor 22, for example.

An example of the nonvolatile memory 242 is, for example, a NAND flash memory. The nonvolatile memory 242 may be a flash memory having a two-dimensional structure or a three-dimensional structure. The nonvolatile memory 242 has a finite data retainable period and a finite number of rewrites.

The data retainable period of the nonvolatile memory 242 is a period in which data written in the nonvolatile memory 242 can be retained. The data retainable period is also referred to as a data retention period. The data retainable period is relied on the degree of wear of the nonvolatile memory 242 due to program/erase (P/E) cycles and other factors. As the degree of wear becomes larger, the data retable period tends to become shorter. Thus, the data retainable period is finitely limited to a certain time period.

The number of rewrites of the nonvolatile memory 242 is limited to the number of program/erase (P/E) cycles in the nonvolatile memory 242. Since the nonvolatile memory 242 wears out as the P/E cycle progresses due to its physical and electrical characteristics, there is an upper limit to the number of rewrites (the P/E cycle count) of the nonvolatile memory 242. Specifically, a data erase operation is executed in units of blocks included in the nonvolatile memory 242, and a data write operation is executed in units of pages included in each block. Since each block wears out by rewriting (data erase operation and thereafter data write operation repeatedly, and the like) due to its characteristics, the number of rewrites of each block has an upper limit. The number of rewrites of each block is also referred to as the number of P/E cycle of the block.

The controller 241 includes an error correction circuit 2413. The error correction circuit 2413 adds an error correction code (ECC) to a content written in the nonvolatile memory 242. The error correction circuit 2413 execute error correction processing to detect and correct an error included in the read content, by using the ECC, when reading the content from the nonvolatile memory 242. If the error correction processing has been successfully executed, the error correction circuit 2413 transmits the content to the processor 22. If the error correction processing has not been successfully executed, for example because of a reason that the read content included error bits exceeding the number of correctable error bits, the error correction circuit 2413 notifies the processor 22 that an error (read error) has occurred in reading the content.

Next, an example of a functional configuration of the processor 22 will be described. FIG. 2 is a block diagram showing the example of the functional configuration of the processor 22 according to the embodiment.

The processor 22 includes a content acquisition unit 2201, a content writing unit 2202, a content reading unit 2203, a content delivery unit 2204, a read error detection unit 2205, a content recovery unit 2206, an error correction processing unit 2207, a delivery capability calculation unit 2208, a recovery determination unit 2209, a delivery capability transmission and reception unit 2210, a recovery instruction reception unit 2211, an error notification unit 2212, and a recovery method selection unit 2213. Some or all of the content acquisition unit 2201, the content writing unit 2202, the content reading unit 2203, the content delivery unit 2204, the read error detection unit 2205, the content recovery unit 2206, the error correction processing unit 2207, the delivery capability calculation unit 2208, the recovery determination unit 2209, the delivery capability transmission and reception unit 2210, the recovery instruction reception unit 2211, the error notification unit 2212, and the recovery method selection unit 2213 may be realized by dedicated firmware or hardware in the cache server 2-1. The units 2201, 2202, 2203, . . . , 2213 of the processor 22 may dividedly be located in the cache server 2-1.

The content acquisition unit 2201 executes acquiring content from another server. The other servers include, for example, the origin server 1, and the cache servers 2-2 and 2-3 other than the cache server 2-1. In a case where the first content is requested from any one of the clients 4-1 to 4-4 and the first content is not stored in the SSDs 24-1 to 24-4, the content acquisition unit 2201 executes acquiring the first content from the origin server 1. In addition, in a case where an error (read error) has occurred in reading the first content from the nonvolatile memory 242, the content acquisition unit 2201 executes acquiring the first content from another server (the origin server 1 or another cache server).

The content writing unit 2202 executes writing the content into the SSDs 24-1 to 24-4. In the writing, the content writing unit 2202 transmits a write command for writing a content to any one of the SSDs 24-1 to 24-4. For example, when the cache server 2-1 acquires a new content, the content writing unit 2202 specifies an SSD as a writing destination of this content among the SSDs 24-1 to 24-4, and issues a write command for writing this content to the specified SSD.

The content reading unit 2203 executes reading a content to be read from any one of the SSDs 24-1 to 24-4. The content reading unit 2203 specifies an SSD that stores a content to be read among the SSDs 24-1 to 24-4, and transmits a read command for reading the content to be read to the specified SSD. For example, in a case where the first content is requested from any one of the clients 4-1 to 4-4 and the first content is stored in the SSD 24-1, the content reading unit 2203 executes reading the first content from the SSD 24-1. At this time, the content reading unit 2203 transmits a read command for designating the first content to the SSD 24-1.

The content delivery unit 2204 executes delivering content. For example, the content delivery unit 2204 delivers a content requested from any one of the clients 4-1 to 4-4 to this client via the network 5-1.

By receiving a notification indicating a read error from any one of the SSDs 24-1 to 24-4 to which the read command was issued, the read error detection unit 2205 detects that an error (read error) has occurred in reading the content from the nonvolatile memory 242 of this SSD.

The content recovery unit 2206 executes recovering the content in which the read error has occurred. The content recovery unit 2206 causes the content acquisition unit 2201 to execute acquiring the content from the origin server 1. The recovery processing executed by the content recovery unit 2206 includes as options a first recovery method in which a recovery target portion of the content, which has been newly acquired by the content acquisition unit 2201, is written to the SSD 24, and a second recovery method in which the recovery target portion is not written to the SSD 24 and is retained in the main memory 23 in order to suppress wear on the nonvolatile memory 242. With respect to the content recovery in the first recovery method, the cache server 2 of the embodiment has a unique mechanism for writing the recovery target portion to the SSD 24 and for managing the recovery target portion. This point is described later.

The error correction processing unit 2207 executes error correction processing. The error correction processing executed in the error correction processing unit 2207 has a higher error correction capability than at least the error correction executed by the error correction circuit 2413 in the controller 241 of each of the SSDs 24-1 to 24-4. For example, the error correction processing unit 2207 executes error correction processing different from the error correction processing executed in the controller 241 of each of the SSDs 24-1 to 24-4 by using data read from the SSDs 24-1 to 24-4, and thus recovers the content to which the read error has occurred. The details of the error correction processing executed by the error correction processing unit 2207 will be described below with reference to FIG. 5.

The delivery capability calculation unit 2208 calculates a delivery capability of the cache server 2-1. The delivery capability of the cache server 2-1 is a capability of the cache server 2-1 related to a deliverable content stored in the nonvolatile memory 242 of each of the SSDs 24-1 to 24-4. That is, a value indicating the capability of the cache server 2-1 with which the cache server 2-1 can directly deliver the content to any client 4 by using the deliverable content stored in the nonvolatile memory 242 of its own self is the delivery capability of the cache server 2-1. In a case where a read error of a certain content has occurred, this content is not a deliverable content until this content is recovered. Therefore, in calculating the delivery capability of the cache server 2-1 immediately after the read error of a certain content has occurred, the content in which the read error has occurred is excluded. The delivery capability of the cache server 2-1 indicates, for example, (A) the total number of contents expected to be delivered by the cache server 2-1 to any client 4 per unit time by using the deliverable content stored in the nonvolatile memory 242 of its own self, (B) the total data size of the content expected to be delivered by the cache server 2-1 per unit time by using the deliverable content stored in the nonvolatile memory 242 of its own self, or (C) the total number of contents expected to be delivered by the cache server 2-1 to any client 4 until the data retention request period of each deliverable content expires, by using the deliverable content stored in the nonvolatile memory 242 of its own self. The delivery capability of the cache server 2-1 is calculated, for example, when any one of the following events (1) to (3) has occurs.

(1) When the cache server 2-1 acquires a new content from the origin server 1.
(2) When the cache server 2-1 detects the occurrence of an error (read error) in reading a content from the nonvolatile memory 242.
(3) When the cache server 2-1 recovers the content in which the read error has occurred and writes the recovered content to the nonvolatile memory 242.

The delivery capability calculation unit 2208 calculates the delivery capability of the cache server 2-1 based at least on the predicted number of reads of each deliverable content stored in the nonvolatile memory 242. The predicted number of reads is different for each deliverable content. For example, the predicted number of reads (predicted number of requests) of a highly popular content can be set to a relatively high value, and the predicted number of reads (predicted number of requests) of an unpopular content can be set to a relatively low value. The predicted number of reads of each content may be the predicted number of reads per unit time (e.g., the predicted number of reads per second), or may be a total predicted number of reads in the data retention request period (or the remaining data retention request period).

The predicted number of reads per unit time of a certain content may be a value designated by the origin server 1 or a distributor (i.e. a distribution source) of this content.

Alternatively, the processor 22 of the cache server 2-1 may measure the number of requests for each content. In this case, the predicted number of reads per unit time of a certain content may be the number of requests per unit time of the latest content.

The delivery capability calculation unit 2208 may, for example, calculate, as the delivery capability of the cache server 2-1, the sum of predicted numbers of times of reading of respective deliverable content stored in the nonvolatile memory 242. In this case, the predicted number of reads of each deliverable content may be the predicted number of reads per unit time, or may be the total predicted number of reads in the data retention request period (or the remaining data retention request period). In a case where the delivery capability calculation unit 2208 calculates the delivery capability of the cache server 2-1 by using the predicted number of reads per unit time, the calculated delivery capability of the cache server 2-1 indicates (A) mentioned above, i.e., the total number of contents expected to be delivered to any client 4 per unit time by the cache server 2-1 by using the deliverable content stored in the nonvolatile memory 242.

In addition, for example, the delivery capability calculation unit 2208 may calculate, as the delivery capability of the cache server 2-1, the sum of the product of the predicted number of reads of each deliverable content stored in the nonvolatile memory 242 and the data size of each deliverable content. In this case, the predicted number of reads of each deliverable content may be the predicted number of reads per unit time, or may be the total predicted number of reads in the data retention request period (or the remaining data retention request period). In a case where the delivery capability calculation unit 2208 calculates the delivery capability of the cache server 2-1 by using the predicted number of reads per unit time, the calculated delivery capability of the cache server 2-1 indicates (B) mentioned above, i.e., the total data size of contents expected to be delivered per unit time by the cache server 2-1 by using the deliverable content stored in the nonvolatile memory 242.

In addition, for example, the delivery capability calculation unit 2208 may calculate, as the delivery capability of the cache server 2-1, the sum of products of the predicted number of reads of each deliverable content stored in the nonvolatile memory 242 and the remaining data retention request period corresponding to each deliverable content. In this case, the predicted number of reads of each deliverable content is the predicted number of reads per unit time. Thus, in this case, the delivery capability of the cache server 2-1 calculated by the delivery capability calculation unit 2208 indicates (C) mentioned above, i.e., the total number of contents expected to be delivered to any client 4 by the cache server 2-1 until the data retention request period of each deliverable content expires, by using the deliverable content stored in the nonvolatile memory 242.

The recovery determination unit 2209 determines whether or not to recover the content in which the read error has occurred. The recovery determination unit 2209 calculates a recovery amount of the delivery capability of the cache server 2 in a case where the content is recovered, and writing cost to the SSD 24 associated with the recovery of the content. In a case where the calculated recovery amount of the delivery capability is greater than the calculated writing cost, the recovery determination unit 2209 determines recovering the content.

In more detail, the recovery determination unit 2209 compares the calculated recovery amount of the delivery capability (recovery amount conversion value) with a value (cost conversion value) obtained by multiplying the calculated writing cost by a predetermined coefficient. As a result of comparing the recovery amount conversion value and the cost conversion value, in a case where the calculated recovery amount of the delivery capability is larger than the cost conversion value, the recovery determination unit 2209 determines recovering the content.

The recovery amount conversion value is obtained, for example, by calculating a product of the most recent number of requests for a content and a ratio of the content capacity to the capacity of the SSD 24 in the cache server 2 (i.e. a percentage of the content capacity to the SSD capacity). The cost conversion value obtained by multiplying the calculated writing cost by the predetermined coefficient is obtained, for example, by calculating a product of the ratio of the size of the recovery target portion to the write size or erase size of the SSD 24, the remaining number of writable times on the SSD 24, and a write amplification factor (WAF) on the SSD 24 relating to the writing of the recovery target portion. For example, the larger size is preferably adopted as the write size or erase size of the SSD 24. The remaining number of writable times is calculated as, for example, a ratio of the number of writes to the SSD 24 to a total number of writable times to the SSD 24.

For example, in a case where the most recent number of requests for content is "1000 times/second" and the ratio of content capacity in the SSD 24 of the cache server 2 is "1 MB/100 GB=0.00001", the recovery amount of the delivery capability is calculated to be 0.01. In a case where the ratio of the size of the recovery target portion to the write or erase size of the SSD 24 is "0.1 MB/10 MB=0.01", the ratio of the number of writes on the SSD 24 to the total number of writable times on the SSD 24 is "50/100=0.5", and the WAF of the SSD 24 is "3", the writing cost is calculated to be 0.015. In a case where a predetermined coefficient for adjusting whether to prioritize wear on a semiconductor storage device or recovery of the delivery capability is "0.5", a value obtained by multiplying the calculated writing cost (0.015) by the predetermined coefficient (0.5) is 0.0075, and since the calculated recovery amount of the delivery capability (0.01) is greater, in this example, it is determined that the content should be recovered. The predetermined coefficient is set based on characteristics such as the number of program/erase cycles (number of rewrites) and the number of acceptable errors in the semiconductor storage device, the delivery capability of the information delivery system, and the usage pattern of the server, etc. Note that, in a case where the units are different, such as for the writing cost and the recovery amount, the predetermined coefficient may be used to convert the units into units that allow comparison between the two. For example, in a case where the unit of the recovery amount of the delivery capability is "time/second" and there is no unit for the writing cost, the unit of the predefined value shall be "second/time". This type of conversion makes it possible to compare the recovery amount of the delivery capability with the writing cost.

Thus, in the cache server 2 of the embodiment, in a case where a content read error occurs, content recovery is not uniformly executed; however, is executed only in a case where the advantage (recovery amount of delivery capability) of recovering the content exceeds the disadvantage (writing cost). In other words, the cache server 2 of the embodiment does not perform content recovery when the disadvantage exceeds the advantage.

Thus, the cache server 2 of the embodiment can suppress the wear of the nonvolatile memory 242 of the SSD 24.

Note that, in a case where it is determined that the content will not be recovered, the delivery of this content to the client 4 who requested the content will be taken over by another cache server 2 under the control of the control server 3.

The aforementioned most recent number of requests for the content, which is used to calculate the recovery amount of the delivery capability, may be replaced by the elapsed time since the content was stored in the cache server 2. Furthermore, the ratio of the content capacity in the capacity of the SSD 24 of the cache server 2 may be replaced with the ratio of the size of the recovery target portion in the size of the content.

The remaining number of writable times of the SSD 24 may be calculated as the ratio of the amount of written data in the SSD 24 to the total amount of writable data in the SSD 24. Alternatively, it may be calculated as the ratio of the current bit error rate of the SSD 24 to an acceptable bit error rate of the SSD 24.

The recovery determination unit 2209 may determine whether or not to recover the content for which a read error has occurred based on the delivery capability calculated by the delivery capability calculation unit 2208. In this case, the aforementioned procedure of comparing the recovery amount of the delivery capability of the cache server 2 and the cost of writing to the SSD 24 can be applied to the determination of whether or not to write the recovered data of the content to SSD 24 in the case where the content is determined to be recovered.

The delivery capability transmission and reception unit 2210 executes transmitting the calculated delivery capability of the cache server 2-1 to each of the other cache servers 2-2 and 2-3 directly or via the control server 3, and receiving the delivery capability of each of the other cache servers 2-2 and 2-3 from each of the other cache servers 2-2 and 2-3 directly or via the control server 3. The configuration in which the cache servers 2-1, 2-2, and 2-3 directly exchange their own delivery capabilities allows the cache servers 2-1, 2-2, and 2-3 to share their delivery capabilities even in an information delivery system in which the control server 3 is not provided. In the information delivery system where the control server 3 is provided, the delivery capability transmission and reception unit 2210 may notify only the control server 3 of the delivery capability of the cache server 2-1, and the control server 3 may notify each of the other cache servers 2-2 and 2-3 of the delivery capability of the cache server 2-1. Furthermore, in the information delivery system where the control server 3 is provided, the delivery capability transmission and reception unit 2210 may receive the delivery capability of each of the other cache servers 2-2 and 2-3 from the control server 3.

Note that it is also possible to use a configuration in which the control server 3 calculates the overall delivery capability of the plurality of cache servers 2, including the cache servers 2-1, 2-2, and 2-3, and notifies each of the cache servers 2-1, 2-2, and 2-3 of the calculated overall delivery capability of the plurality of cache servers 2. The recovery instruction reception unit 2211 receives a recovery instruction from the control server 3. The recovery instruction includes information for an instruction to recover a predetermined content. The predetermined content designated by the recovery instruction is content to be recovered. The content to be recovered is, for example, a content in which the read error has occurred. The control server 3 is notified of the content in which the read error has occurred by the error notification unit 2212 to be described below. The content to be recovered may be other contents than the content in which the read error has occurred.

The error notification unit 2212 notifies the control server 3 of an occurrence of a read error of a content and information for identifying this content in which the read error has occurred. Furthermore, the error notification unit 2212 may notify the control server 3 of not only the occurrence of the read error of the content and the information for identifying the content in which the read error has occurred but also either or both of information indicating the details of the read error that has occurred and information indicating the degree of wear of the nonvolatile memory 242.

The recovery method selection unit 2213 selects a method of recovery processing to be executed in the content recovery unit 2206. As described above, the recovery processing to be executed by the content recovery unit 2206 includes, as options, a first recovery method of writing the recovery target portion of the content to the SSD 24 and a second recovery method of retaining the recovery target portion in the main memory 23. The recovery method selection unit 2213 calculates the remaining retention period of the content and the data retainable period of the SSD 24.

The remaining retention period of the content is the remaining required retention period (first remaining retention period) for the retention period specified by the content distributor. The data retainable period of the SSD 24 is a period of time until the content is deleted which is determined according to a write algorithm (FIFO/LRU) applied to write data to the SSD 24. The data retainable period of the SSD 24 may also be referred to as the remaining retention period (second remaining retention period) until the content is erased from the storage device. In the case of the FIFO method, for example, if data is being written at a rate of 1 TB/day on the cache server 2 with a total capacity of 10 TB, if certain content was written nine days ago, the remaining retention period for that content is one day. In the case of the LRU method, this is an estimated period until deletion, calculated from the amount of data written per unit time in the cache server 2, based on a list managed in the order of use.

In a case where the calculated remaining retention period of the content is longer than the calculated data retainable period of the SSD 24, the recovery method selection unit 2213 selects the first recovery method. That is, the recovery target portion of the content is written to the SSD 24. On the other hand, in a case where the remaining retention period of the content is shorter than the data retainable period of the SSD 24, the recovery method selection unit 2213 selects the second recovery method. That is, the recovery target portion is retained in the main memory 23 without being written to the SSD 24.

For example, in a case where the remaining retention period of the content is "three weeks" and the data retainable period of the SSD 24 is "two weeks", the recovery method selection unit 2213 selects the first recovery method in which the recovery target portion of the content is written to the SSD 24. In a case where the remaining retention period of the content is "two weeks" and the data retainable period of the SSD 24 is "three weeks", the recovery method selection unit 2213 selects the second recovery method in which the recovery target portion is retained in the main memory 23 without being written to the SSD 24. In the latter case, one week of the "three-week" data retainable period of the SSD 24 is wasted by storing unnecessary data.

In this manner, in the cache server 2 of the embodiment, the content recovery method is selected so that writing to the SSD 24 that generates the waste of merely retaining unnecessary data is not performed.

Thus, the cache server 2 of the embodiment can suppress the wear of the nonvolatile memory 242 of the SSD 24.

The remaining retention period of the content may be estimated from an access history of the cache server 2 from the client 4. For this estimation, a Zipf distribution (popularity) or trends over time can be used. Alternatively, the remaining retention period of the content may be calculated based on a retention period set by the cache server 2.

Figure 3:
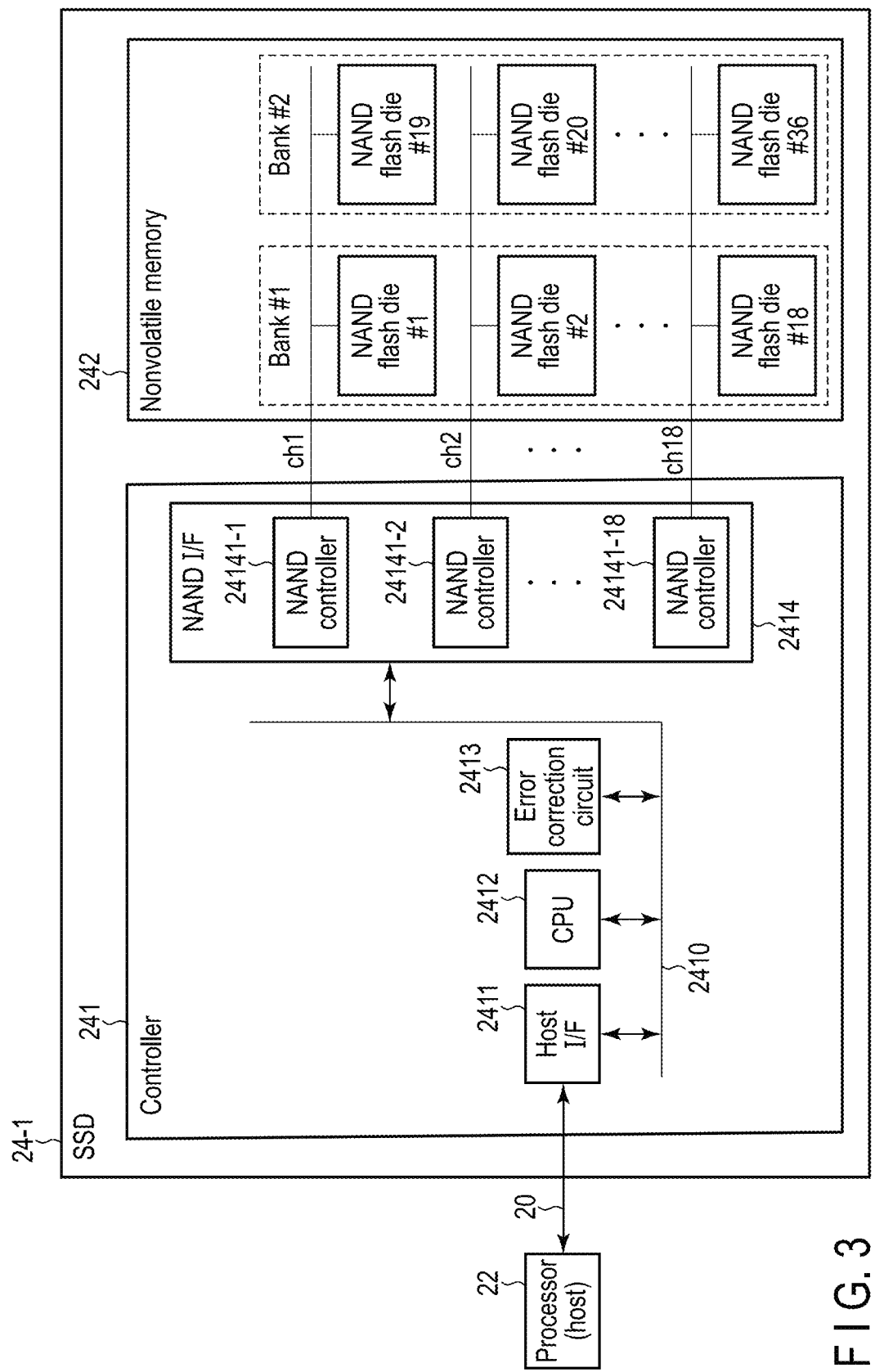
FIG. 3 is a block diagram showing an example of a configuration of a storage device (SSD) of the cache server according to the embodiment.

Next, a detailed configuration of the storage device will be described. FIG. 3 is a block diagram showing an example of a configuration of the storage device of the cache server according to the embodiment. FIG. 3 focuses on the SSD 24-1 of the cache server 2-1; but the other SSDs 24-2 to 24-4 of the cache server 2-1 also have the similar configuration to the SSD 24-1. Furthermore, each of the SSDs included in each of the other cache servers 2-2 and 2-3 also has the similar configuration to the SSD 24-1.

The SSD 24-1 includes the controller 241 and the nonvolatile memory 242.

The controller 241 is a memory controller. The controller 241 is a control circuit, such as a system-on-a-chip (SoC). The controller 241 is electrically connected to the nonvolatile memory 242. The controller 241 processes each of I/O commands received from the processor 22. These I/O commands include a write command, which is a command for writing data to the nonvolatile memory 242 of the SSD 24-1, and a read command, which is a command for reading data from the nonvolatile memory 242, etc. From the viewpoint of the SSD 24-1, the processor 22 is an external host (host processor). When the controller 241 receives a write command from the processor 22, the controller 241 executes writing data in the nonvolatile memory 242. When the controller 241 receives a read command from the processor 22, the controller 241 executes reading data from the nonvolatile memory 242. As a physical interface that connects the controller 241 and the nonvolatile memory 242, for example, a toggle NAND flash interface or an open NAND flash interface (ONFI) is used. Each function of the controller 241 can be realized by dedicated hardware, a processor executing a program, or a combination of the dedicated hardware and the processor.

The nonvolatile memory 242 is a nonvolatile semiconductor memory. The nonvolatile memory 242 includes, for example, a plurality of nonvolatile memory dies. The nonvolatile memory die is also referred to as a nonvolatile memory chip. Each of the plurality of nonvolatile memory dies is, for example, a NAND flash memory die. Hereinafter, the nonvolatile memory die is also referred to as a NAND flash die or simply a die.

Next, an internal configuration of the controller 241 will be described. The controller 241 includes, for example, a host interface (host I/F) 2411, a CPU 2412, the error correction circuit 2413, and an NAND interface (NAND I/F) 2414. These components are connected to each other via an internal bus 2410.

The host interface 2411 is a communication interface circuit that executes communication with the processor 22 (host processor). The host interface 2411 is realized, for example, by a PCIe™ controller.

The CPU 2412 is a processor that controls each component of the controller 241. The CPU 2412 executes various types of processing by executing a control program (firmware) stored in the nonvolatile memory 242 or ROM, which is not shown.

The error correction circuit 2413 executes encoding processing when data is written in the nonvolatile memory 242. In the encoding processing, the error correction circuit 2413 adds an error correction code (ECC) as a redundant code to data to be written in the nonvolatile memory 242. When data is read from the nonvolatile memory 242, the error correction circuit 2413 executes decoding processing. In the decoding processing, the error correction circuit 2413 executes error correction of the data by using the ECC added to the data read from the nonvolatile memory 242. In a case where the number of error bits included in this data is more than the number of error bits correctable by the error correction circuit 2413, the error correction circuit 2413 notifies the processor 22 that an error has occurred in reading this data. This error is referred to as a read error.

The NAND interface 2414 is a circuit that controls the nonvolatile memory 242. The NAND interface 2414 is electrically connected to a plurality of NAND flash dies included in the nonvolatile memory 242.

Next, an example of an internal configuration of the nonvolatile memory 242 will be described.

In FIG. 3, an example is shown in which the nonvolatile memory 242 includes 36 NAND flash dies #1 to #36. Each of the individual NAND flash dies is independently operable. Thus, the NAND flash die functions as a unit that can operate in parallel. The NAND interface 2414 includes, for example, NAND controllers 24141-1, 24141-2, . . . , and 24141-18. Each of the NAND controllers 24141-1, 24141-2, . . . , and 24141-18 is connected to channels ch1, ch1, . . . , and ch18, respectively. Each of the NAND controllers 24141-1, 24141-2, . . . , and 24141-18 is connected to one or more NAND flash dies via the corresponding channel. In FIG. 3, a case in which two NAND flash dies are connected to each of the channels ch1, ch2, . . . , and ch18 is exemplified. In this case, the NAND controller 24141-1 is connected to the NAND flash dies #1 and #19 via the channel ch1. The NAND controller 24141-2 is connected to the NAND flash dies #2 and #20 via the channel ch2. The NAND flash dies #1, #2, . . . , and #18 are handled as a bank #1 by the controller 241. The NAND flash dies #19, #20, . . . , and #36 are handled as a bank #2 by the controller 241. The bank is a unit in which a plurality of NAND flash dies are operated in parallel by an interleaving operations.

Figure 4:
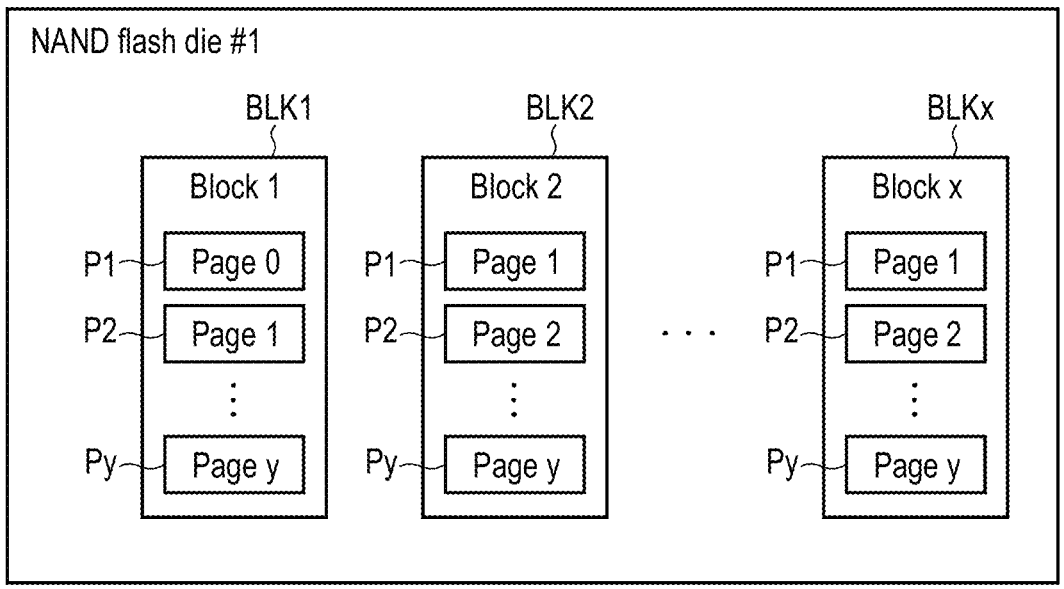
FIG. 4 is a block diagram showing an example of a configuration of a NAND flash die, which is an example of a nonvolatile memory die according the embodiment.

Next, an example of a configuration of the NAND flash die will be described. FIG. 4 is a block diagram showing the example of the configuration of the NAND flash die. FIG. 4 shows the example of the configuration of the NAND flash die #1, but the other NAND flash dies have the similar configuration as the NAND flash die #1.

The NAND flash die #1 includes a plurality of blocks (BLK1, BLK2, . . . , and BLKx). Each block BLK is a minimum unit of a data erase operation. Each of the plurality of blocks includes a plurality of pages (P1, P2, . . . , and Py). Each page P is a unit of a data writing operation and a data reading operation. The page includes a set of memory cells connected to a same word line. The page is also referred to as a physical page.

Figure 5:
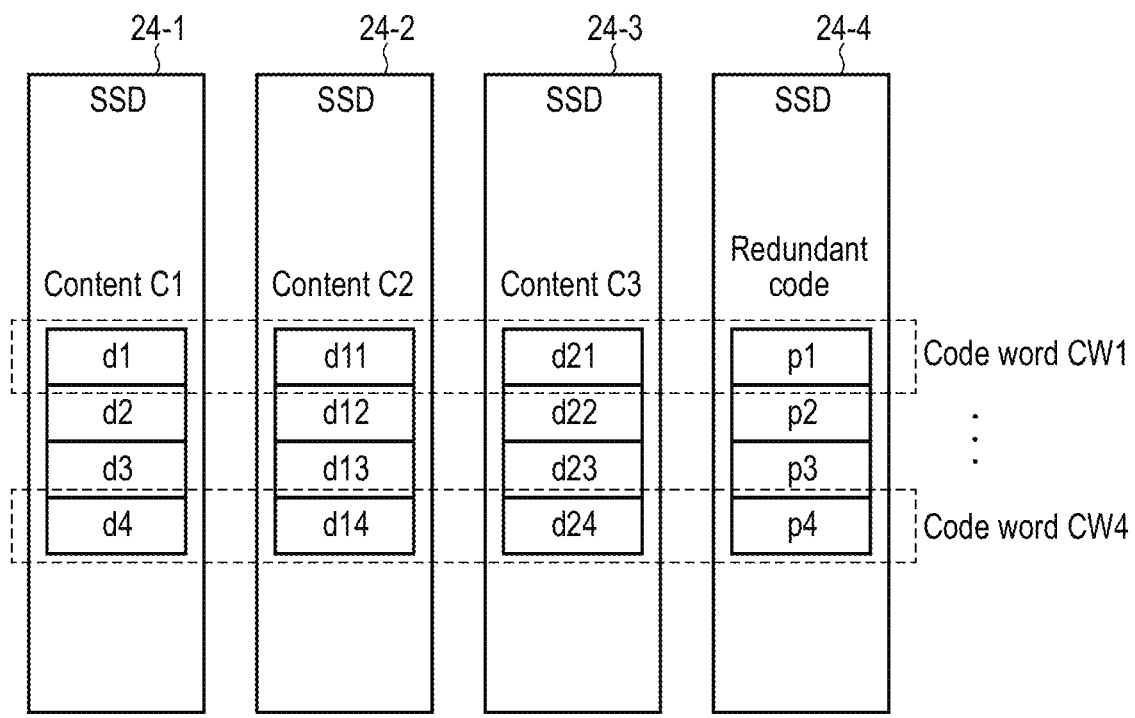
FIG. 5 is a diagram illustrating an example of error correction executed in the cache server according to the embodiment.

Next, the error correction processing in the cache server 2-1 will be described. FIG. 5 is a diagram illustrating an example of the error correction processing executed in the cache server 2-1 according to the embodiment.

In FIG. 5, a content C1 is stored in the SSD 24-1, a content C2 is stored in the SSD 24-2, a content C3 is stored in the SSD 24-3, and a redundancy code is stored in the SSD 24-4.

The content C1 includes data d1, data d2, data d3, and data d4. The content C2 includes data d11, data d12, data d13, and data d14. The content C3 includes data d21, data d22, data d23, and data d24. The redundancy code includes parity p1, parity p2, parity p3, and parity p4.

The data d1, the data d11, the data d21, and the parity p1 constitute a code word CW1. The data d2, the data d12, the data d22, and the parity p2 constitute a code word CW2. The data d3, the data d13, the data d23, and the parity p3 constitute a code word CW3. The data d4, the data d14, the data d24, and the parity p4 constitute a code word CW4.

The processor 22 may generate a redundant code when writing the content C1, the content C2, and the content C3. The processor 22 may then write the content C1, the content C2, the content C3, and the redundancy code to each SSD in parallel. For example, the processor 22 may execute writing of the code word CW1 by executing, in parallel, processing of transmitting a write command to the SSD 24-1 for writing the data d1, processing of transmitting a write command to the SSD 24-2 for writing the data d11, processing of transmitting a write command to the SSD 24-3 for writing the data d21, and processing of transmitting a write command to the SSD 24-4 for writing the parity P1. In a similar manner, the processor 22 may execute writing of the code words CW2 to CW4.

Here, a case is assumed in which an error (read error) occurs in the reading of the content C1 by the SSD 24-1, and the error correction processing unit 2207 of the processor 22 executes error correction processing for the content C1. Here, a case is assumed in which the number of error bits in data d1 of the content C1 exceeds the number of error bits that can be corrected by the controller 241 of the SSD 24-1.

First, the processor 22 reads components of the code word CW1 including the data d1. Specifically, the processor 22 transmits a read command to the SSD 24-2 for reading the data d11, a read command to the SSD 24-3 for reading the data d21, a read command to the SSD 24-4 for reading the parity p1. The error correction processing unit 2207 of the processor 22 recalculates the correct data d1 by using the read data d11, data d21, and parity p1. In this manner, an error of data (in this case, the data d1) including many error bits in the content in which the read error has occurred is corrected. Then, the error correction processing unit 2207 recovers the content C1 by the recalculated data d1 and the data d2 to d4 normally read from the SSD 24-1.

Thus, it is possible to recover a content in which a read error has occurred, in a manner that an error included in the content in which the read error has occurred is corrected by using the code word CW including multiple data and parity, which are written in the SSDs 24-1 to 24-4 included in the cache server 2-1 in a distributed manner.

Next, content delivery processing executed in the cache server 2-1 will be described. FIG. 6 is a flowchart showing the procedure of the content delivery processing executed in the cache server 2-1 according to the embodiment.

First, the cache server 2-1 receives a request from a client (step S101).

The cache server 2-1 determines whether or not a cache hit has occurred (step S102). In this case, the cache server 2-1 refers to the content management table 231 to determine whether or not the content designated by the request received in S101 is stored in any one of the nonvolatile memories 242 of the SSDs 24-1 to 24-4 in the cache server 2-1.

In a case where there is a cache hit (Yes in S102), that is, in a case where the content designated by the request is stored in any one of the nonvolatile memories 242 of the SSDs 24-1 to 24-4, the cache server 2-1 reads this content from the SSD including the nonvolatile memory 242 in which this content is stored (step S103).

The cache server 2-1 delivers the content read in S103 to the client (step S104).

In the case of a cache miss (No in S102), that is, in a case where the content designated by the request is not stored in any of the nonvolatile memories 242 of the SSDs 24-1 to 24-4, the cache server 2-1 acquires the content designated by the request from the origin server 1 (step S105).

The cache server 2-1 delivers the content acquired in S105 to the client (step S106).

The cache server 2-1 writes the content acquired in S105 to the nonvolatile memory 242 included in the SSD of a write destination selected from the SSDs 24-1 to 24-4 (step S107).

Thus, by executing the content delivery processing, the cache server 2-1 delivers the requested content to the client in response to the request received from the client. At this time, in a case where the requested content is stored in the storage device (here, the SSDs 24-1 to 24-4) of the cache server 2-1, the cache server 2-1 delivers the content read from the storage device to the client. In a case where the requested content is not stored in the storage device of the cache server 2-1, the cache server 2-1 acquires the requested content from the origin server 1, delivers the acquired content to the client, and, furthermore, writes the acquired content to the storage device.

Next, error detection processing will be described. FIG. 7 is a diagram illustrating the error detection processing executed in the information delivery system including the cache server 2-1 according to the embodiment.

1. First, any one of the clients 4-1 to 4-4 transmits a request for requesting a content to the cache server 2-1. The processor 22 of the cache server 2-1 receives the request via the NIC 21.
2. The processor 22 transmits a read request for reading the content designated by the received request to, for example, the SSD 24-1.
3 to 4. The controller 241 of the SSD 24-1 receives the read request and reads the content from the nonvolatile memory 242.
5. The error correction circuit 2413 of the controller 241 executes error correction processing by using the ECC attached to the content read from the nonvolatile memory 242. In a case where the number of error bits included in the read content exceeds the number of error bits correctable by the error correction circuit 2413, the error correction processing fails.
6. If the error correction processing fails, the error correction circuit 2413 notifies the processor 22 of the read error. By receiving the notification indicating the read error from the controller 241, the processor 22 detects that the read error has occurred in reading this content from the nonvolatile memory 242.

Next, content recovery processing will be described. FIG. 8 is a diagram illustrating the content recovery processing executed in the information delivery system including the cache server according to the embodiment. Here, a case is assumed in which a read error occurs in the SSD 24-1 for certain content, and the first recovery method is selected, in which the content is acquired from the origin server 1 and a recovery target portion of the content is written to the SSD 24.

First, the cache server 2-1 acquires the content in which the read error has occurred from the origin server 1.

The acquired content is temporarily stored in the main memory 23.

The content stored in the main memory 23 is then written to the SSD 24-1. At this time, the processor 22 transmits a write command to the SSD 24-1 for requesting writing of this content.

Figure 9:
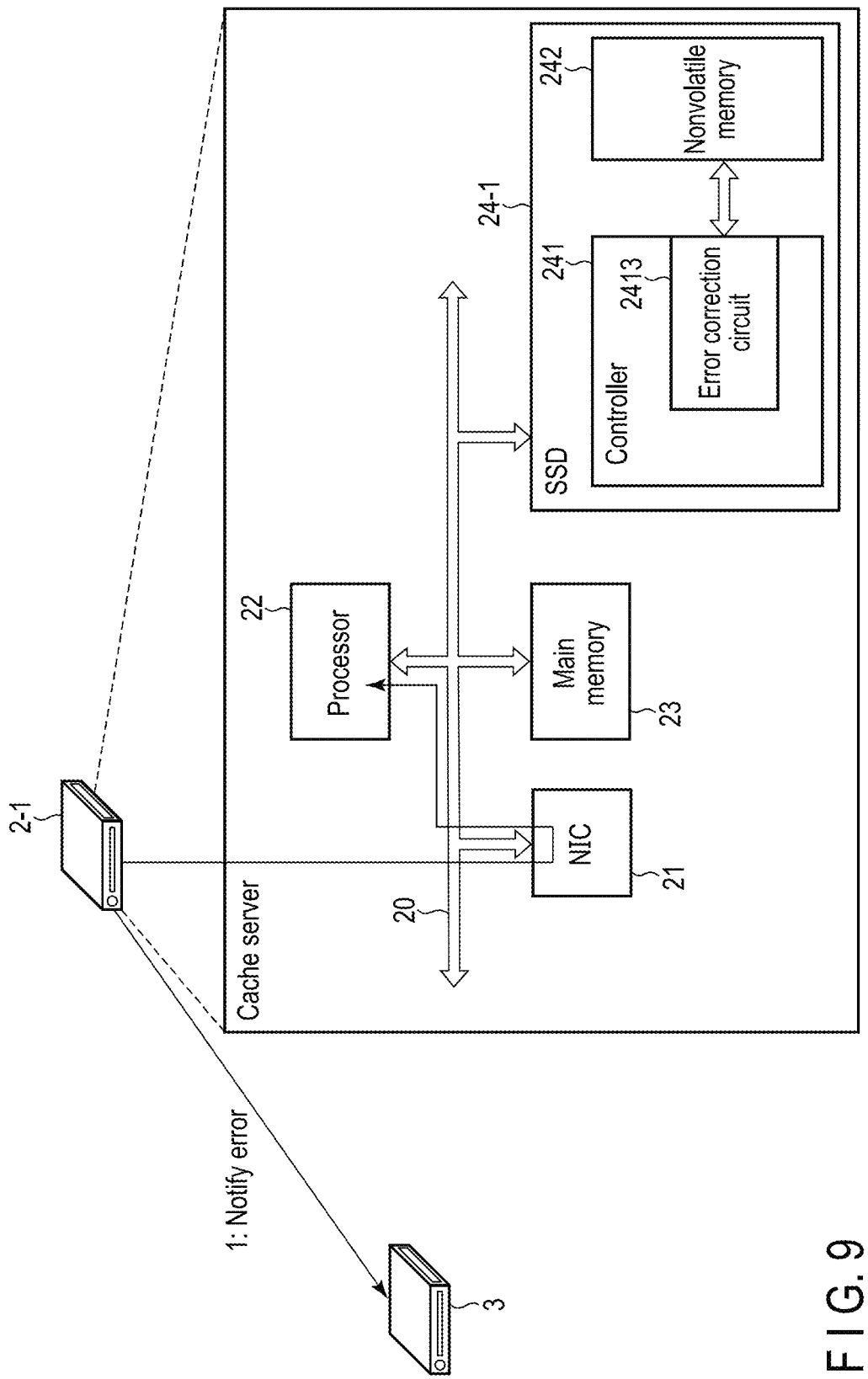
FIG. 9 is a diagram illustrating error notification processing executed in the information delivery system including the cache server according to the embodiment.

Next, error notification processing will be described. FIG. 9 is a diagram illustrating the error notification processing executed in the information delivery system including the cache server 2-1 according to the embodiment. Here, a case is assumed in which a read error has occurred for certain content in the SSD 24-1 in the cache server 2-1.

1. The processor 22 notifies the control server 3 of the error in response to detection of the read error of a certain content by the read error detection unit 2205 of the processor 22. By this error notification, the processor 22 notifies the control server 3 of the occurrence of the read error and the content in which the read error has occurred.

Next, recovery instruction transmission processing will be described. FIG. 10 is a diagram illustrating the recovery instruction transmission processing executed in the information delivery system including the cache server 2-1 according to the embodiment.

1. The control server 3 transmits a recovery instruction to the cache server 2-1. The recovery instruction may include information for designating a predetermined content. The cache server 2-1 stores the received recovery instruction in the main memory 23. Based on the recovery instruction stored in the main memory 23, the cache server 2-1 can determine whether or not to recover the content in which the read error has occurred.

Next, the delivery capability of the cache server 2-1 will be described. FIG. 11 is a diagram showing a first example of the delivery capability of the cache server 2-1 according to the embodiment.

Here, a case is assumed in which the SSDs 24-1 to 24-4 in the cache server 2-1 store content A, content B, content C, content D, content E, and content F. FIG. 11 shows the predicted number of reads of each content and the delivery capability of the cache server 2-1. The predicted number of reads of each content may be either the predicted number of reads per unit time or the total predicted number of reads in the data retention request period (or the remaining data retention request period). In FIG. 11, a case is assumed in which the predicted number of reads per unit time is the predicted number of reads of each content. The predicted number of reads of a certain content per unit time is the number of times that content is predicted to be requested from the client per unit time (e.g., one second). In the following, a case is assumed in which the delivery capability of the cache server 2-1 is calculated based on the predicted number of reads of each content stored in the nonvolatile memory 242 of the SSDs 24-1 to 24-4. The delivery capability of the server 2-1 may be calculated based on not only the predicted number of reads of each content, but also the predicted number of reads of each content and the remaining data retention request period of each content, or based on the predicted number of reads of each content and the size of each content, etc.

Content C1 has a predicted number of reads of 30 times/second. Content C2 has a predicted number of reads of 50 times/second. Content C3 has a predicted number of reads of 20 times/second. Content C4 has a predicted number of reads of 30 times/second. Content C5 has a predicted number of reads of 45 times/second. Content C6 has a predicted number of reads of 25 times/second.

In this case, the delivery capability of the cache server 2-1 is A1. The delivery capability A1 is calculated, for example, based on the total number of the predicted numbers of times of reading of contents C1 to C6.

Here, a case is assumed in which an error occurs in reading content C4 from the nonvolatile memory 242. FIG. 12 is a diagram showing a second example of the delivery capability of the cache server 2-1 according to the embodiment.

Due to the occurrence of an error in reading content C4, content C4 becomes content that cannot be delivered from the cache server 2-1. Therefore, when calculating the delivery capability of the cache server 2-1, the delivery capability calculation unit 2208 of the processor 22 calculates the delivery capability based on the information of the contents C1 to C3 and the contents C5 to C6 excluding the content C4. Here, the calculated delivery capability of the cache server 2-1 is A2, and A2 is a value less than A1. That is, since content C4 has become an undeliverable content, the delivery capability of the cache server 2-1 decreases.

Since the predicted number of reads of each content has an influence on the delivery capability of the cache server 2-1, in a case where a read error of not the content C4 but a content (e.g., content C2) having a more predicted number of reads than the content C4 has occurred, the delivery capability of the cache server 2-1 will decrease to a value less than A2. Conversely, in a case where a read error of not the content C4 but a content (e.g., content C3) having a less predicted number of reads than the content C4 has occurred, the delivery capability of the cache server 2-1 will become a value more than A2. However, this delivery capability will be a value less than A1.

Figure 13:
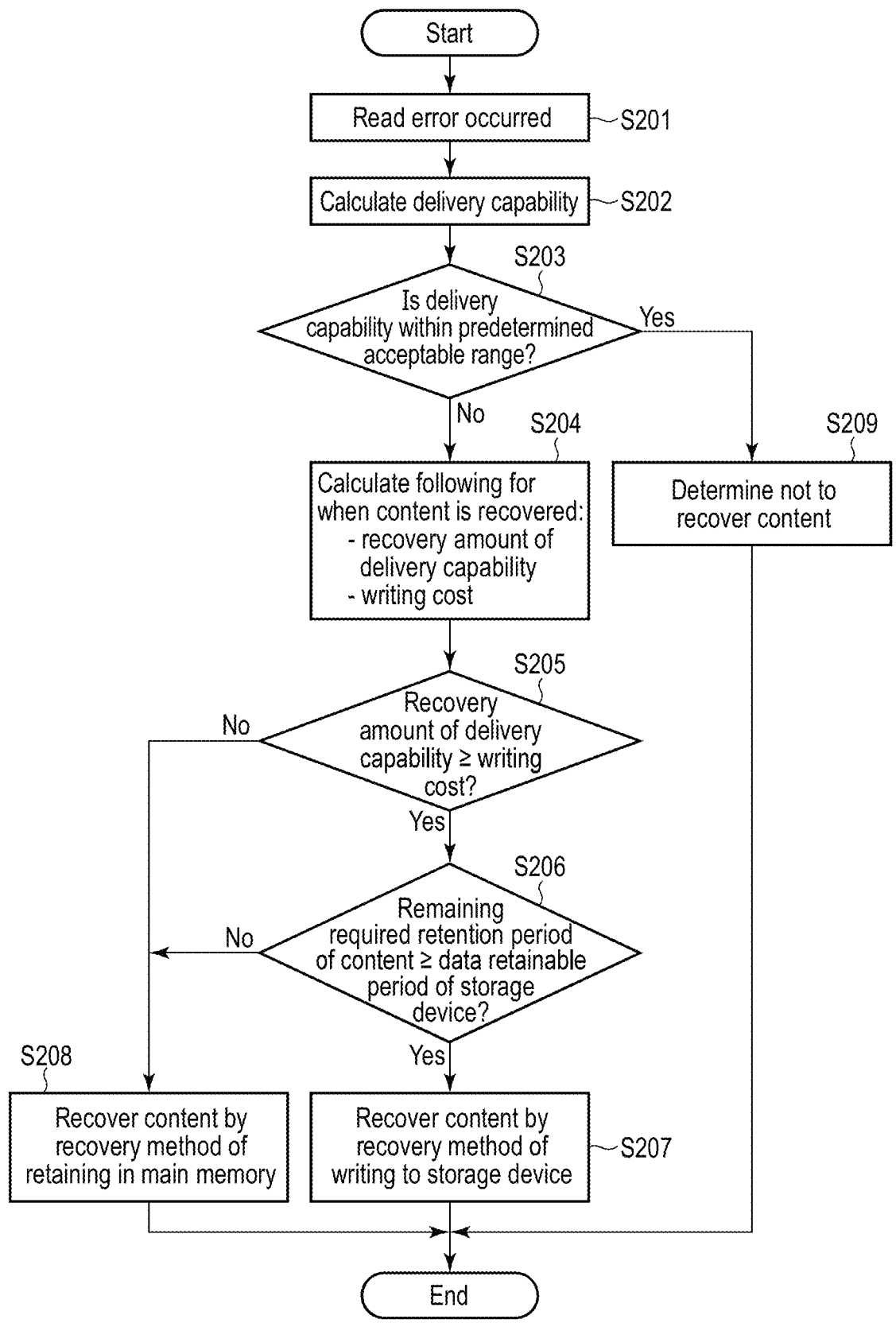
FIG. 13 is a flowchart showing an example of an operation procedure in a case where the cache server according to the embodiment generates a content read error.

Next, an example of an operation procedure of the cache server 2 in a case where a content read error occurs in the cache server 2 will be described. FIG. 13 is a flowchart showing an example of an operation procedure in a case where the cache server 2 according to the embodiment generates the content read error. Here, a case is assumed in which whether or not to recover the content for which a read error has occurred is determined based on the delivery capability of the cache server 2.

The processor 22 detects the occurrence of a read error (step S201). In a case where the occurrence of a read error is detected, the control server 3 is notified that the occurrence of a read error has been detected.

The processor 22 calculates the delivery capability of the cache server 2, taking into account the read error detected in S201 (step S202). That is, the processor 22 calculates the delivery capability of the cache server 2 by treating content that could not be read from the SSD 24 due to the occurrence of the read error as content that cannot be delivered.

The processor 22 determines whether or not the delivery capability calculated in S202 is within a predetermined acceptable range (step S203). When the delivery capability is within the acceptable range, it means that the cache server 2 can maintain the expected capability even if the delivery of the content with a read error is stopped. This acceptable range can be set in advance based on the storage capacity of the cache server, other specifications, or the usage pattern of the cache server, etc. The delivery capability of the cache server 2 calculated in S202 may be notified to the control server 3 with the notification that the occurrence of a read error has been detected.

In a case where the delivery capability is not within the acceptable range (No in S203), the processor 22 calculates the recovery amount of the delivery capability and the writing cost to the SSD 24 in a case where the content is recovered (step S204). The processor 22 compares the recovery amount of the delivery capability and the writing cost calculated in S204 (step S205).

In a case where the recovery amount of the delivery capability (converted value) is equal to or greater than the writing cost (converted value) (Yes in S205), the processor 22 then determines whether or not the remaining required retention period of the content is longer than the data retainable period of the SSD 24 (storage device) (step S206). In a case where the remaining required retention period of the content is equal to or longer than the data retainable period of the SSD 24 (Yes in S206), the processor 22 selects a recovery method to write the recovery target portion of the content to the SSD 24 for recovery (step S207). On the other hand, in a case where the remaining required retention period of the content is shorter than the data retainable period of the SSD 24 (No in S206), the processor 22 selects a recovery method to retain the recovery target portion of the content in the main memory 23 without writing to the SSD 24 for performing recovery (step S208). Also, in a case where the recovery amount of the delivery capability is smaller than the writing cost (No in S205), the processor 22 selects a recovery method to retain the recovery target portion of the content in the main memory 23 without writing to the SSD 24 for performing recovery (step S208). Furthermore, in a case where the delivery capability is within the acceptable range (Yes in S203), the processor 22 determines that the content will not be recovered (step S209). Note that, as a modified example of the determination flow of S205 and S206 in the flowchart of FIG. 13, in a case where the objects to be compared are equivalent (in a case where recovery amount of delivery capability (converted value)=writing cost (converted value) in S205, or in a case where remaining required retention period of content=data retainable period of storage device in S206), the branch may be set to a different branch destination (No in S205 or No in S206) than described earlier. Such settings can be made, for example, by tuning the cache server 2.

Next, a first unique mechanism that the cache server 2 of the embodiment has for writing the recovery target portion of the content to the SSD 24 will be described. FIG. 14 is a diagram illustrating a method of selecting a block to write the recovery target portion of the content to the cache server 2 according to the embodiment.

The content recovery unit 2206 first searches for a block whose data retainable period is longer than the remaining required retention period of the content as a candidate for a block to write the recovery target portion of the content from among possible candidate blocks. The data retainable period of a block varies depending on the degree of wear of the block. Specifically, the data retainable period of a block becomes shorter as the block wears out. In a case where a plurality of blocks with a data retainable period longer than the remaining required retention period of the content are found, the content recovery unit 2206 selects from among them the block with the shortest data retainable period. That is, a block whose data retainable period is closest to the remaining required retention period of the content is selected.

FIG. 14(A) shows an example of a case where a plurality of blocks whose data retainable period is longer than the remaining required retention period of the content are found. Specifically, the three blocks of block 1, block 2, and block 3 are found.

Among these three blocks, block 2 has the shortest data retainable period; therefore, the content recovery unit 2206 selects block 2 as the block to write the recovery target portion of the content. By leaving block 1 and block 3, it is possible to respond to the case where recovery of content with a longer remaining required retention period becomes necessary.

FIG. 14(B) shows an example of a case where there is no block, among the possible candidate blocks, whose data retainable period is longer than the remaining required retention period of the content. In a case where there is no block whose data retainable period is longer than the remaining required retention period of the content, the content recovery unit 2206 selects the block with the longest data retainable period among the possible candidate blocks. Specifically, in FIG. 14(B), there are three possible candidate blocks, block 4, block 5, and block 6, all of which have a data retainable period shorter than the remaining required retention period of the content.

Among these three blocks, block 5 has the longest data retainable period; therefore, the content recovery unit 2206 selects block 5 as the block to write the recovery target portion of the content. By selecting block 5, which has the lowest degree of wear, the degree of wear between blocks can be smoothed.

Figure 15:
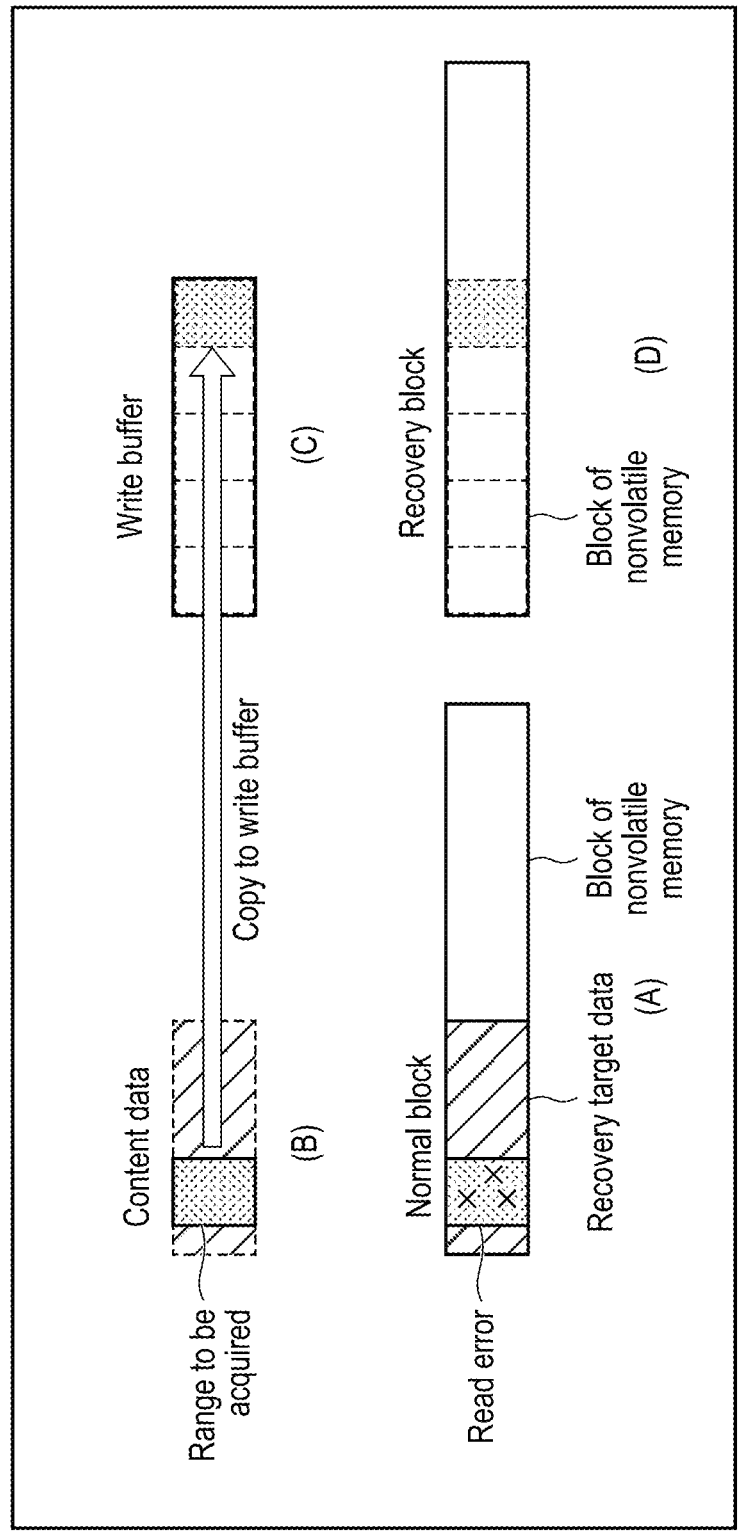
FIG. 15 is a diagram illustrating a method of writing the recovery target portion of the content to the storage device in the cache server according to the embodiment.

A second unique mechanism that the cache server 2 of the embodiment has for writing the recovery target portion of the content to the SSD 24 will now be described. FIG. 15 is a diagram illustrating a method of writing the recovery target portion of the content to the SSD 24 in the cache server 2 according to the embodiment.

FIG. 15(A) shows a block of the SSD 24 that stores content data in which a read error has occurred. Note that the content data stored in this block can be the entire content or a portion of the content. The content data including the recovery target portion in this block is the recovery target data. Here, a normal block is a block other than the recovery block described below in all blocks of the SSD 24.

In the cache server 2 of the embodiment, the content recovery unit 2206 does not acquire the entire recovery target data from the origin server 1, but acquires only data in the range in which the read error occurred within the recovery target data, that is, only the data of the recovery target portion from the origin server 1, in units of a predetermined data size. Specifically, the content acquisition unit 2201 is instructed to acquire from the origin server 1 only data within the range in which the read error occurred in the recovery target data. FIG. 15(B) shows the range of data to be acquired from the origin server 1 within the recovery target data.

The cache server 2 in the embodiment secures a certain number of recovery blocks from among all the blocks in the SSD 24. The recovery block is a block dedicated to storing data of the recovery target portion of the content, i.e., the recovery data. The cache server 2 of the embodiment also secures a write buffer for the recovery block in the main memory 23. The content recovery unit 2206 stores the recovery data acquired from the origin server 1 in the write buffer for the recovery block. FIG. 15(C) shows the write buffer for the recovery block that stores the recovery data acquired from the origin server 1.

When the amount of data stored in the write buffer for the recovery block reaches the amount of a write unit of the SSD 24, the content recovery unit 2206 executes writing of the data stored in the write buffer for the recovery block to the recovery block. Specifically, the content writing unit 2202 is instructed to write the data in the write buffer for the recovery block to the recovery block. FIG. 15(D) shows the recovery block to which the data stored in the write buffer for the recovery block is written.

Thereafter, in a case where a request for this content data is received, complete content data is acquired by combining the content data including a part where the read error occurred, which is stored in the normal block, with recovery data of the part where the read error occurred, which is stored in the recovery block and is newly acquired from the origin server 1.

Thus, in the cache server 2 of the embodiment, the amount of data written to the SSD 24 in connection with the content recovery can be reduced, and the nonvolatile memory 242 of the SSD 24 can be suppressed from being worn out.

In addition, in a case where the content data that is the recovery target data for the normal block is deleted while the recovery data for the part where the read error occurred is stored in the write buffer for the recovery block, the content recovery unit 2206 also deletes the recovery data stored in the write buffer for the recovery block. In this manner, the cache server 2 of the embodiment can further reduce the amount of data written to the SSD 24 in connection with content recovery, and can further suppress the wear of the nonvolatile memory 242 of the SSD 24.

Note that, in a case where a read error occurs over the entire content data stored in a certain block, the content recovery unit 2206 may write the recovery data acquired from the origin server 1 to the normal block instead of the recovery block. That is, the recovery processing executed by the content recovery unit 2206 may subdivide the first recovery method of writing the recovery target portion of the content to the SSD 24 and may further include as options a method of writing the recovery data to the recovery block and a method of writing the recovery data to the normal block.

Figures 16, 17, 18:
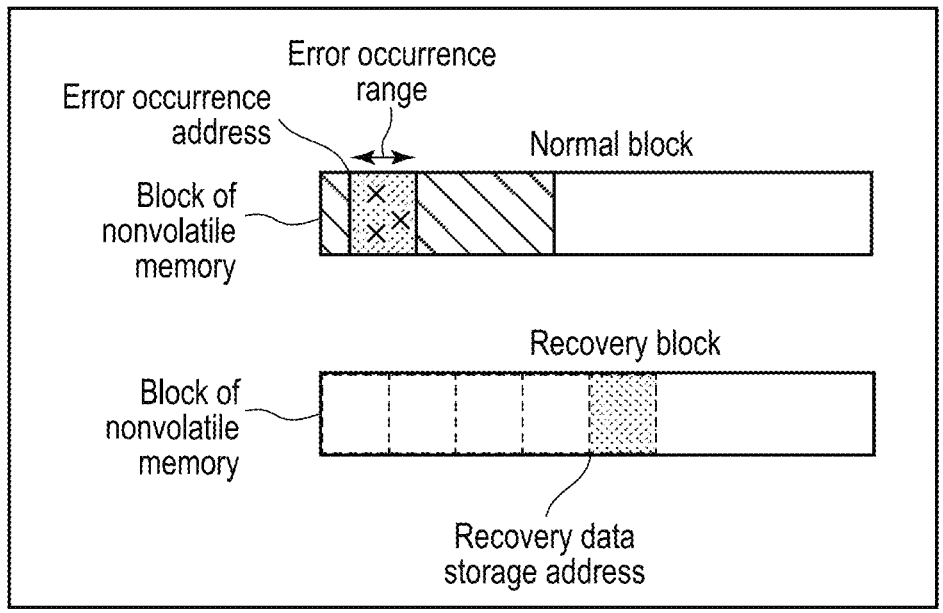
FIG. 16 is a diagram showing an example in which content data is divided into normal blocks and recovery blocks and stored in the cache server according to the embodiment.
FIG. 17 is a diagram showing an example of a recovery data management table possessed by the cache server according to the embodiment.
FIG. 18 is a diagram showing an example of a recovery block management table possessed by the cache server according to the embodiment.

Next, the unique mechanism that the cache server 2 of the embodiment has for managing the recovery target portion of the content will be described. FIG. 16 is a diagram showing an example where content data is stored separately in a normal block and a recovery block. More precisely, the content data including the part where the read error occurred is stored in the normal block, and the recovery data of a part where the read error occurred is stored in the recovery block. FIG. 16 also shows an error occurrence address and an error occurrence range in the content data stored in the normal block, and a recovery data storage address of the recovery data in the recovery block.

In order to manage the content data stored in the SSD 24 in such a state, the cache server 2 of the embodiment includes a recovery data management table and a recovery block management table. The recovery data management table and the recovery block management table are part of the content management table 231. FIG. 17 is a diagram showing an example of the recovery data management table. FIG. 18 is a diagram showing an example of the recovery block management table.

As shown in FIG. 17, the recovery data management table includes a content ID field, an error occurrence address field, an error occurrence range field, a recovery data storage address field, and an evaluation value field.

The content ID field holds an identifier that can uniquely identify the content. The error occurrence address field holds the error occurrence address shown in FIG. 16. The error occurrence range field holds the error occurrence range shown in FIG. 16. The recovery data storage address field holds an address indicating a location of the recovery block that stores the recovery data in the SSD 24 and the recovery data storage address shown in FIG. 16. Note that the recovery data storage address shown in FIG. 16 may include an address indicating a location of the recovery block in the SSD 24. The evaluation value field holds an evaluation value of the content calculated by, for example, multiplying the number of requests for the content per unit time by the remaining retention period of the content.

Based on this recovery data management table, the cache server 2 of the embodiment can correctly combine and acquire content data stored separately in normal blocks and recovery blocks.

On the other hand, as shown in FIG. 18, the recovery block management table includes a recovery block ID field, an address field, and a total evaluation value field.

The recovery block ID field holds an identifier that can uniquely identify the recovery block. The address field holds an address indicating a location of the recovery block in the SSD 24. The total evaluation value field holds a total evaluation value calculated from the evaluation values (held in the evaluation value field of the recovery data management table) of each of a plurality of content in which recovery data is stored in the recovery block.

As mentioned above, the cache server 2 of the embodiment secures a certain number of recovery blocks from among all the blocks in the SSD 24. Then, the cache server 2 of the embodiment uses these certain number of recovery blocks in the FIFO method. In a case where the cache server 2 of the embodiment collects any one of the recovery blocks to store new recovery data, the cache server 2 selects the one with the lowest total evaluation value held in the total evaluation value field of the recovery block management table as a candidate for collecting.

The above describes an example in which the cache server 2, which generated a content read error, determines whether or not to recover the content; however, the control server 3, which receives a notification from the cache server 2 that a content read error has occurred, may also determine whether or not to recover the content. In other words, the cache server 2 may recover content based on instructions from the control server 3.

FIG. 19 is a flowchart showing an example of an operation procedure in a case where the control server 3 of the CDN including the cache server 2 according to the embodiment receives a notification that a content read error has occurred.

A processor of the control server 3 receives a read error from the cache server 2 (step S301). The processor calculates the delivery capability of the entire system based on, for example, the delivery capability of each cache server 2, which is regularly received from all cache servers 2, and the delivery capability of the cache server 2 after the read error occurred, which is received with the read error from the cache server 2 that generated the read error (step S302).

The processor determines whether or not the entire system has sufficient delivery capability (step S303). In a case where the entire system does not have sufficient delivery capability (No in S303), the processor instructs the cache server 2 that generated the read error to recover the content (step S304). When the entire system has sufficient delivery capability, it means that other cache servers 2 are in the state of being able to deliver the content instead of the cache server 2 that generated the read error.

On the other hand, in a case where the entire system has sufficient delivery capability (Yes in S303), the processor forwards a request from the client 4 to the other cache server 2 (step S305). That is, the processor determines that the content will not be recovered at the cache server 2 that generated the read error. In a case where the recovery is not performed, the processor adds information on the content for which a read error occurred to the content recovery unimplemented list (step S306). The information on the content to be added to the content recovery unimplemented list includes information on the cache server 2 that generated the read error.

Figure 20:
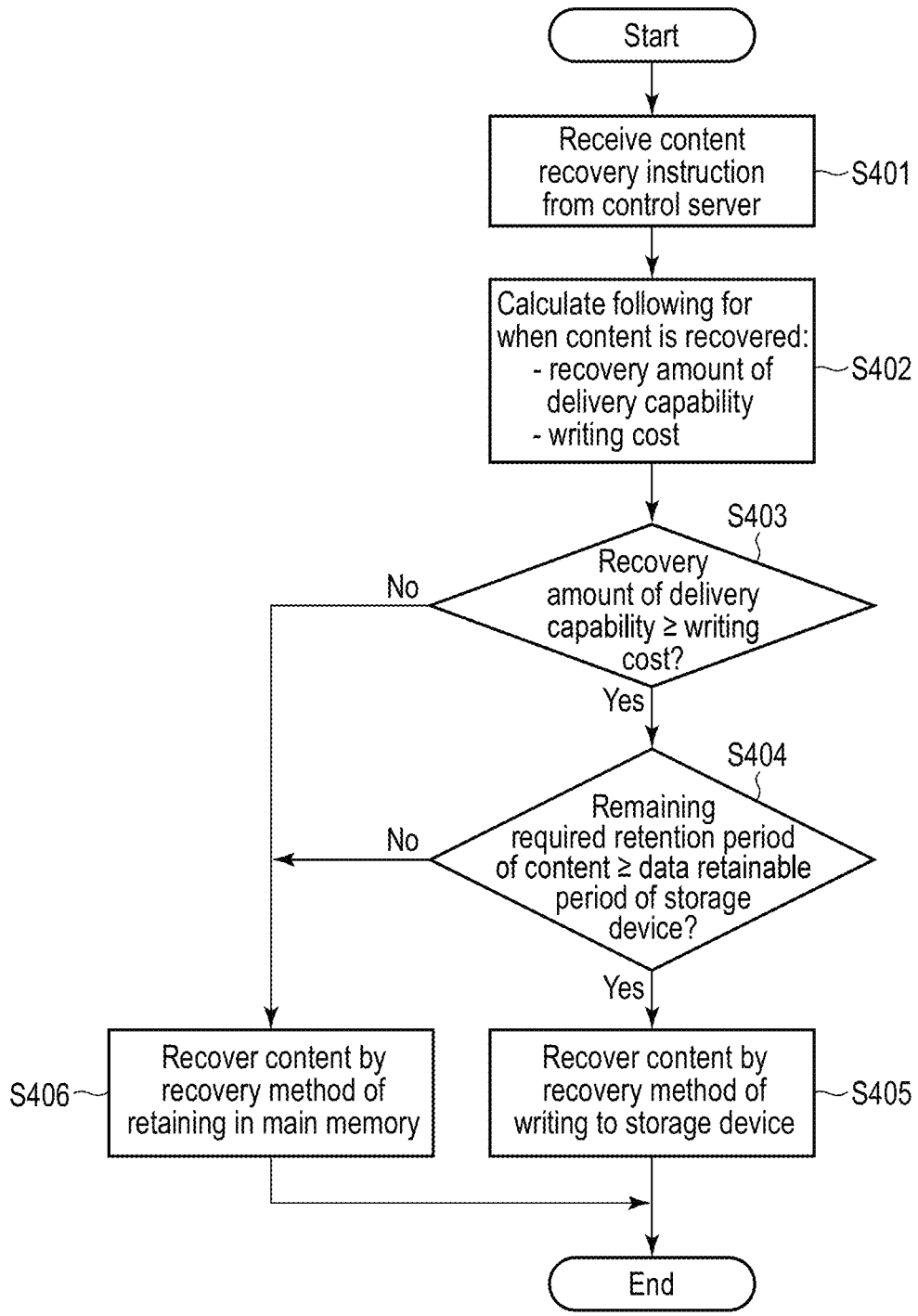
FIG. 20 is a flowchart showing an example of an operation procedure in a case where the cache server according to the embodiment receives a content recover instruction from the control server.

FIG. 20 is a flowchart showing an example of an operation procedure in a case where the cache server 2 of the embodiment receives an instruction for content recovery from the control server 3.

The processor 22 of the cache server 2 receives an instruction for content recovery from the control server 3 (step S401). Even in the case of receiving an instruction for content recovery from the control server 3, the cache server 2 selects the content recovery method as described with reference to FIG. 13. Steps S402 to S406 in FIG. 20 correspond to steps S204 to S208 in FIG. 13.

That is, the processor 22 calculates the recovery amount of the delivery capability and the writing cost to the SSD 24 in a case where the content is recovered (step S402). The processor 22 compares the recovery amount of the delivery capability and the writing cost calculated in S402 (step S403).

In a case where the recovery amount of the delivery capability (converted value) is equal to or greater than the writing cost (converted value) (Yes in S403), the processor 22 then determines whether or not the remaining required retention period of the content is longer than the data retainable period of the SSD 24 (step S404). In a case where the remaining required retention period of the content is equal to or longer than the data retainable period of the SSD 24 (Yes in S404), the processor 22 selects a recovery method to write the recovery target portion of the content to the SSD 24 for recovery (step S405).

On the other hand, in a case where the remaining required retention period of the content is shorter than the data retainable period of the SSD 24 (No in S404), the processor 22 selects a recovery method to retain the recovery target portion of the content in the main memory 23 without writing to the SSD 24 for performing recovery (step S406). Also, in a case where the writing cost is larger than the recovery amount of the delivery capability (No in S403), the processor 22 selects a recovery method to retain the recovery target portion of the content in the main memory 23 without writing to the SSD 24 for performing recovery (step S406). Note that, as a modified example of the determination flow of S403 and S404 in the flowchart of FIG. 20, in a case where the values of the objects to be compared are equivalent (for example, in a case where recovery amount of delivery capability (converted value)=writing cost (converted value) in S403, or in a case where remaining required retention period of content=data retainable period of storage device in S404), the branch may be set to a different branch destination (No in S403 or No in S404) than described earlier. Such settings can be made, for example, by tuning the cache server 2.

Thus, even in a case where the cache server 2 of the embodiment receives an instruction to recover content from the control server 3, it is possible to suppress wear on the nonvolatile memory 242 of the SSD 24 by selectively using the aforementioned first recovery method, which writes the recovery target portion of the content to the SSD 24, and second recovery method, which retains the recovery target portion in the main memory 23, depending on the situation.

Figure 21:
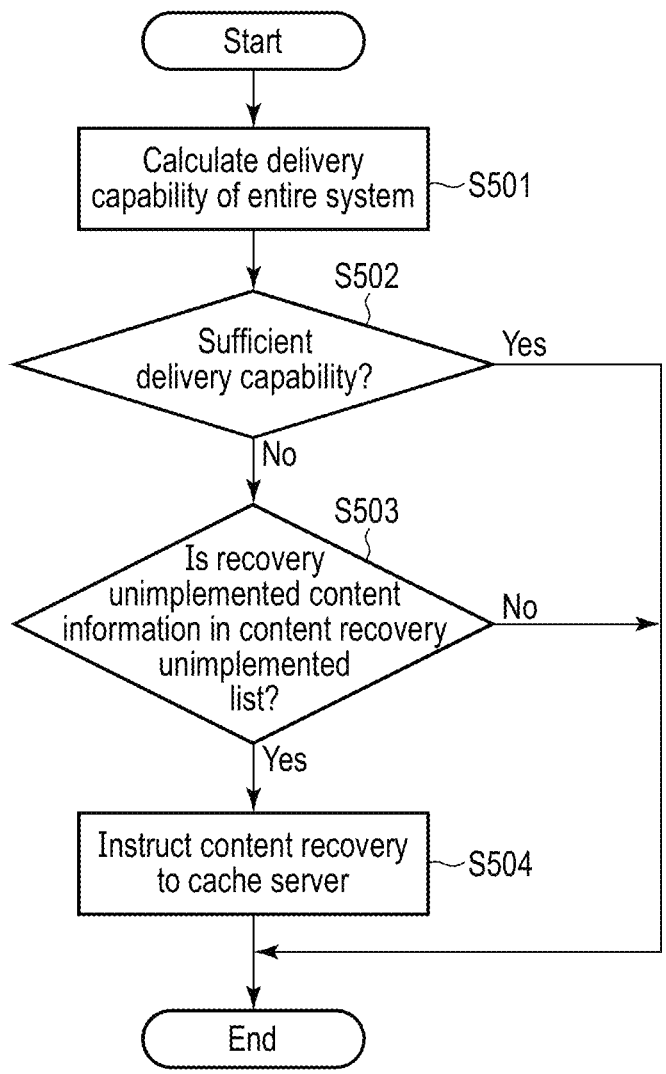
FIG. 21 is a flowchart showing an example of an operation procedure in which the control server of the information delivery system including the cache server according to the embodiment instructs a cache server to recover content based on a content recovery unimplemented list.

FIG. 21 is a flowchart showing an example of an operation procedure in which the control server 3 of the CDN including the cache server 2 according to the embodiment instructs the cache server 2 to recover content based on the content recovery unimplemented list. This operation is performed by the control server 3 on a regular basis.

The processor of the control server 3 calculates the delivery capability of the entire system (step S501). The processor determines whether or not the entire system has sufficient delivery capability (step S502). In a case where the entire system does not have sufficient delivery capability (No in S502), the processor determines whether or not there is content information for which recovery is unimplemented in the content recovery unimplemented list (step S503).

In a case where there is content information for which recovery is unimplemented in the content recovery unimplemented list (Yes in S503), the processor instructs the cache server 2 that generated the content read error which caused the content information for which recovery is unimplemented to be added to the content recovery unimplemented list to recover the content (step S504).

In this manner, the control server 3 manages the content recovery unimplemented list, so that, in a case where the entire system had sufficient delivery capability at the time a certain cache server 2 generated the read error, therefore, did not perform content recovery; however, subsequently, the entire system turns out to have insufficient delivery capability, the content recovery can be instructed at that time to the cache server 2 that generated the read error.

Note that the instruction to recover content to the cache server 2 based on the content recovery unimplemented list may be given together with the notification of the occurrence of a read error of the content, as described with reference to FIG. 19. FIG. 22 is a flowchart showing an example of an operation procedure in which the control server 3 of the CDN including the cache server 2 according to the embodiment instructs the cache server 2 to recover content based on the content recovery unimplemented list in a case where it receives a notification that a content read error has occurred.

FIG. 22 is obtained by adding steps S503 to S504 in FIG. 21 as steps subsequent to step S304 in FIG. 19.

That is, in a case where the entire system does not have enough delivery capability (No in S303), the processor of the control server 3 first forwards the request from the client 4 to another cache server 2 (step S305). Then, the processor determines whether or not there is content information for which recovery is unimplemented in the content recovery unimplemented list (step S503).

In a case where there is content information for which recovery is unimplemented in the content recovery unimplemented list (Yes in S503), the processor instructs the cache server 2 that generated the content read error which caused the content information for which recovery is unimplemented to be added to the content recovery unimplemented list to recover the content (step S504).

This enables the control server 3 to follow changes in the situation more rapidly than in the case where it periodically instructs the cache server 2 to recover the content based on the content recovery unimplemented list.

As described above, in the cache server of the embodiment, content recovery involving writing to the SSD 24 is not uniformly executed, but only in a case where the advantage (recovery amount of delivery capability) of recovering the content exceeds the disadvantage (writing cost).

Also, in the case of performing content recovery involving writing to the SSD 24, the amount of writing to the SSD 24 is reduced.

In other words, the cache server of the embodiment can suppress the wear of the nonvolatile memory 242 of the SSD 24.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A cache server connectable via a network to an origin server holding content, the cache server comprising:
    a storage device including a controller and a nonvolatile memory of which data retainable period and number of writes is finite, the controller controlling the nonvolatile memory; and
    a processor capable of delivering the content acquired from the origin server to a client requesting the content, wherein
    the storage device is capable of caching the content held on the origin server, and
    the processor is configured to
        determine, when an error occurs when reading the cached content from the storage device, whether or not to recover the content based on a recovery amount of a delivery capability of the cache server as a result of recovering the content and a cost of writing data to the storage device associated with recovery of the content, and
        select, when determined to recover the content, a recovery method of the content based on a first remaining retention period during which the content should be retained and a second remaining retention period until the content is to be erased from the storage device.

2. The cache server of claim 1, wherein the processor is further configured to determine to recover the content when the recovery amount of the delivery capability of the cache server is greater than the cost of writing data to the storage device.

3. The cache server of claim 1, further comprising a volatile memory, wherein
    the processor is further configured to
        select, when the first remaining retention period is longer than the second remaining retention period, a first recovery method to write recovery data of the content to the nonvolatile memory, and
        select, when the first remaining retention period is equal to or shorter than the second remaining retention period, a second recovery method to hold the recovery data in the volatile memory without writing it to the nonvolatile memory.

4. The cache server of claim 1, wherein the processor is further configured to calculate the first remaining retention period based on an access history to the content.

5. The cache server of claim 1, wherein the processor is further configured to calculate the first remaining retention period based on a retention period specified by a distributor of the content or by the cache server.

6. The cache server of claim 1, wherein the processor is further configured to calculate the second remaining retention period based on an amount of data written to the storage device per unit time and a write algorithm applied to write data to the storage device.

7. The cache server of claim 1, wherein the processor is further configured to calculate a recovery amount of a delivery capability of the content based on the number of accesses to the content in a most recent first period and a ratio of capacity of the content in capacity of the storage device.

8. The cache server of claim 1, wherein the processor is further configured to calculate a recovery amount of a delivery capability of the content based on an elapsed time since the content was housed in the cache server and a ratio of capacity of the content in capacity of the storage device.

9. The cache server of claim 1, wherein the processor is further configured to calculate the cost of writing data based on a ratio of a size of recovery data of the content to a write size or erase size of the storage device and a remaining number of writable times of the storage device.

10. The cache server of claim 9, wherein the processor is further configured to calculate the remaining number of writable times of the storage device as a ratio of the number of writes of the storage device to a total number of writable times of the storage device.

11. The cache server of claim 9, wherein the processor is further configured to calculate the remaining number of writable times of the storage device as a ratio of an amount of data written to the storage device to a total amount of writable data in the storage device.

12. The cache server of claim 9, wherein the processor is further configured to calculate the remaining number of writable times of the storage device as a ratio of current bit error rate of the storage device to an acceptable bit error rate.

13. The cache server of claim 1, wherein the processor is further configured to:
secure a certain number of blocks from among all blocks in the nonvolatile memory as recovery blocks for storing recovery data of the content;
manage a data retainable period of each of the certain number of recovery blocks; and
select a recovery block with a shortest data retainable period from among recovery blocks whose data retainable period is equal to or longer than the first remaining retention period as a block to write recovery data of the content.

14. The cache server of claim 13, wherein when there is no recovery block with the data retainable period equal to or longer than the first remaining retention period, the processor is further configured to select a recovery block with the longest data retainable period.

15. The cache server of claim 14, wherein when a plurality of recovery blocks exist as candidates, the processor is further configured to select a recovery block with the lowest number of data writes.

16. The cache server of claim 15, wherein when content data existing in a buffer temporarily storing recovery data to be written to the recovery block, and corresponding to recovery data before writing to the recovery block has been erased from the storage device, the processor is further configured to erase from the buffer recovery data from which the corresponding content data is erased.

17. The cache server of claim 13, wherein the processor is further configured to:
calculate a total evaluation value for each of the certain number of recovery blocks based on evaluation values of content data corresponding to a plurality of recovery data stored in each of the certain number of recovery blocks; and
select a recovery block to be collected for writing new recovery data based on the total evaluation value.

18. The cache server of claim 1, wherein
the cache server is connectable via the network to a control server that controls delivery of the content to the client, and
when an error occurs in reading the content, the processor is further configured to notify the control server of the occurrence of error in reading the content and the delivery capability of the cache server.

19. The cache server of claim 18, wherein when an instruction to recover the content is received from the control server, the processor is further configured to recover the content for which an error has occurred during the reading.

20. A content delivery system comprising:
an origin server that holds content;
a plurality of cache servers that acquire the content from the origin server and deliver the content to a client; and
a control server that controls the cache servers to deliver the content to the client, wherein
each of the plurality of cache servers is configured to
transmit a delivery capability of the cache server to the control server at each predetermined timing,
transmit, when an error occurs in the content held in the cache server, to the control server that an error has occurred in the content, and
recover, when an instruction to recover the content in which the error has occurred is received from the control server, the content,
the control server is configured to
receive delivery capabilities from the plurality of cache servers, and
when a notification is received from any one of the plurality of cache servers that an error has occurred in the content,
calculate a delivery capability of an entire system from the delivery capability of each of the plurality of cache servers,
determine whether or not to recover the content at the cache server in which the content error occurred based on the delivery capability of the entire system, and
instruct, when it is determined that the content recovery is necessary, the cache server in which the content error occurred to recover the content.

* * * * *